US012165452B2

(12) United States Patent
Shimizu et al.

(10) Patent No.: US 12,165,452 B2
(45) Date of Patent: Dec. 10, 2024

(54) ELECTRONIC KEY TERMINAL

(71) Applicant: Panasonic Intellectual Property Management Co., Ltd., Osaka (JP)

(72) Inventors: Takashi Shimizu, Kanagawa (JP); Yuichi Suehiro, Kanagawa (JP); Koichi Sasaki, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 176 days.

(21) Appl. No.: 17/881,336

(22) Filed: Aug. 4, 2022

(65) Prior Publication Data

US 2023/0039052 A1 Feb. 9, 2023

(30) Foreign Application Priority Data

Aug. 5, 2021 (JP) ................................ 2021-128996
Jan. 19, 2022 (JP) ................................ 2022-006534

(51) Int. Cl.
*G07C 9/00* (2020.01)

(52) U.S. Cl.
CPC ..... *G07C 9/00944* (2013.01); *G07C 9/00309* (2013.01)

(58) Field of Classification Search
CPC .. G07C 9/00944; G07C 9/00309; G07C 9/00; H01H 13/06; H01H 13/063; H01H 9/04; H01H 9/041; H01H 2009/048; H01H 2223/00
See application file for complete search history.

(56) References Cited

U.S. PATENT DOCUMENTS

| | | | | |
|---|---|---|---|---|
| 5,822,192 A | 10/1998 | Hayashi | | |
| 7,046,136 B2 * | 5/2006 | Sugimoto | H01H 9/0235 | 340/407.1 |
| 7,050,292 B2 * | 5/2006 | Shimura | B60R 16/0239 | 206/307 |
| 7,142,413 B2 * | 11/2006 | Sugimoto | G07C 9/00944 | 341/173 |
| 2018/0080249 A1 | 3/2018 | Watanabe | | |

FOREIGN PATENT DOCUMENTS

| | | |
|---|---|---|
| JP | 9-8474 A | 1/1997 |
| JP | 2018-131868 A | 8/2018 |
| WO | 2016/157792 A1 | 10/2016 |
| WO | 2018/158932 A1 | 9/2018 |

* cited by examiner

*Primary Examiner* — Lheiren Mae A Caroc
(74) *Attorney, Agent, or Firm* — Seed IP Law Group LLP

(57) ABSTRACT

An electronic key terminal includes a first case and a second case, an elastic member including a planar portion and a wall portion protruding from at least a part of a periphery of the planar portion in a direction from the first case toward the second case, and an electronic board housed in a space defined by the first case and the second case. The wall portion includes protruding portions protruding from opposing sides of the wall portion. The electronic board is partially disposed between the third planar portion and the protruding portions.

19 Claims, 18 Drawing Sheets

ELECTRONIC KEY TERMINAL

TECHNICAL FIELD

The present disclosure relates to an electronic key terminal.

BACKGROUND ART

There is known an electronic key terminal for a vehicle that unlocks or locks a door of the vehicle or permits an engine of the vehicle to start by performing wireless communication with the vehicle, for example, as described in JP-A-H09-008474, WO-A1-2018/158932 and JP-A-2018-131868.

JP-A-H09-008474 discloses a seal structure of a case, the seal structure of a case including: a case integrally formed by combining an opening portion of an upper case and an opening portion of a lower case; a sealing rubber accommodated in the case and having a groove portion formed on an inner wall portion over an entire circumference; and a printed circuit board fitted to the groove portion of the inner wall portion of the sealing rubber, in which the sealing rubber is sandwiched between an outer peripheral edge portion of the printed circuit board and the inner wall portion of the case.

SUMMARY OF INVENTION

The sealing rubber disclosed in JP-A-H09-008474 has a protruding portion over an entire circumference inside the opening portion. Therefore, when the circuit board is attached to the sealing rubber, it is necessary to attach the circuit board to the sealing rubber while expanding the protruding portion by hand, which is not good in workability.

The present disclosure has been made in view of the above-described circumstances, and an object thereof is to provide an electronic key terminal in which a circuit board can be easily attached to an elastic member using rubber as an example.

The present disclosure provides an electronic key terminal including: a first case having a first planar portion disposed along a predetermined plane; a second case having a second planar portion disposed along the predetermined plane, at least a part of the second case being in contact with the first case; an elastic member having a predetermined elastic modulus, the elastic member including: a third planar portion, at least a part of the third planar portion being disposed along the predetermined plane between the first planar portion and the second planar portion; and a wall portion protruding from at least a part of a periphery of the third planar portion in a direction from the first planar portion toward the second planar portion; and an electronic board housed in a space defined by the first case and the second case, at least a part of the electronic board being disposed along the predetermined plane between the third planar portion and the second planar portion, wherein in a plan view as viewed in a direction from the second planar portion toward the first planar portion, a shape of the third planar portion has a first side and a second side facing the first side, wherein at least a part of the wall portion of the first side of the third planar portion includes a first protruding portion protruding from the first side toward the second side, wherein at least a part of the wall portion of the second side of the third planar portion includes a second protruding portion protruding from the second side toward the first side, wherein a first portion of the electronic board, which is a part of the electronic board, is disposed between the third planar portion and the first protruding portion, and wherein a second portion of the electronic board, which is a part of the electronic board, is disposed between the third planar portion and the second protruding portion.

According to the present disclosure, it is possible to provide an electronic key terminal in which a circuit board can be easily assembled to an elastic member.

DESCRIPTION OF EMBODIMENTS

Hereinafter, embodiments in which an electronic key terminal is specifically disclosed in the present disclosure will be described in detail with reference to the drawings as appropriate. However, unnecessarily detailed descriptions may be omitted. For example, detailed descriptions of well-known matters and redundant descriptions of substantially the same configurations may be omitted. This is to avoid unnecessary redundancy in the following description and to facilitate understanding for those skilled in the art. It should be noted that the accompanying drawings and the following description are provided for those skilled in the art to fully understand the present disclosure, and are not intended to limit the subject matter described in the claims.

First Embodiment

Introduction to First Embodiment

There is known an electronic key terminal for a vehicle that unlocks or locks a door of the vehicle or permits an engine of the vehicle to start by performing wireless communication with the vehicle.

WO-A1-2016/157792 discloses an electronic key for a vehicle, the electronic key for a vehicle including: an upper case component that forms an upper side of a key case; a lower case component that forms a lower side of the key case; a wireless communication function component that is housed in the key case; and an operation portion that is disposed on a surface of the upper case component, in which by performing an push operation on the operation portion, a door of the vehicle can be locked and unlocked and a trunk of the vehicle can be opened by wireless communication.

An electronic key terminal for a vehicle is required to be reduced in manufacturing cost. As one method for reducing the manufacturing cost, there is a method for reducing the number of components constituting an electronic key terminal for a vehicle.

Therefore, in the following first embodiment, an electronic key terminal for a vehicle for a purpose of reducing the number of components constituting the electronic key terminal for a vehicle will be described.

<Configuration of Electronic Key Terminal for Vehicle>

Figure 1:
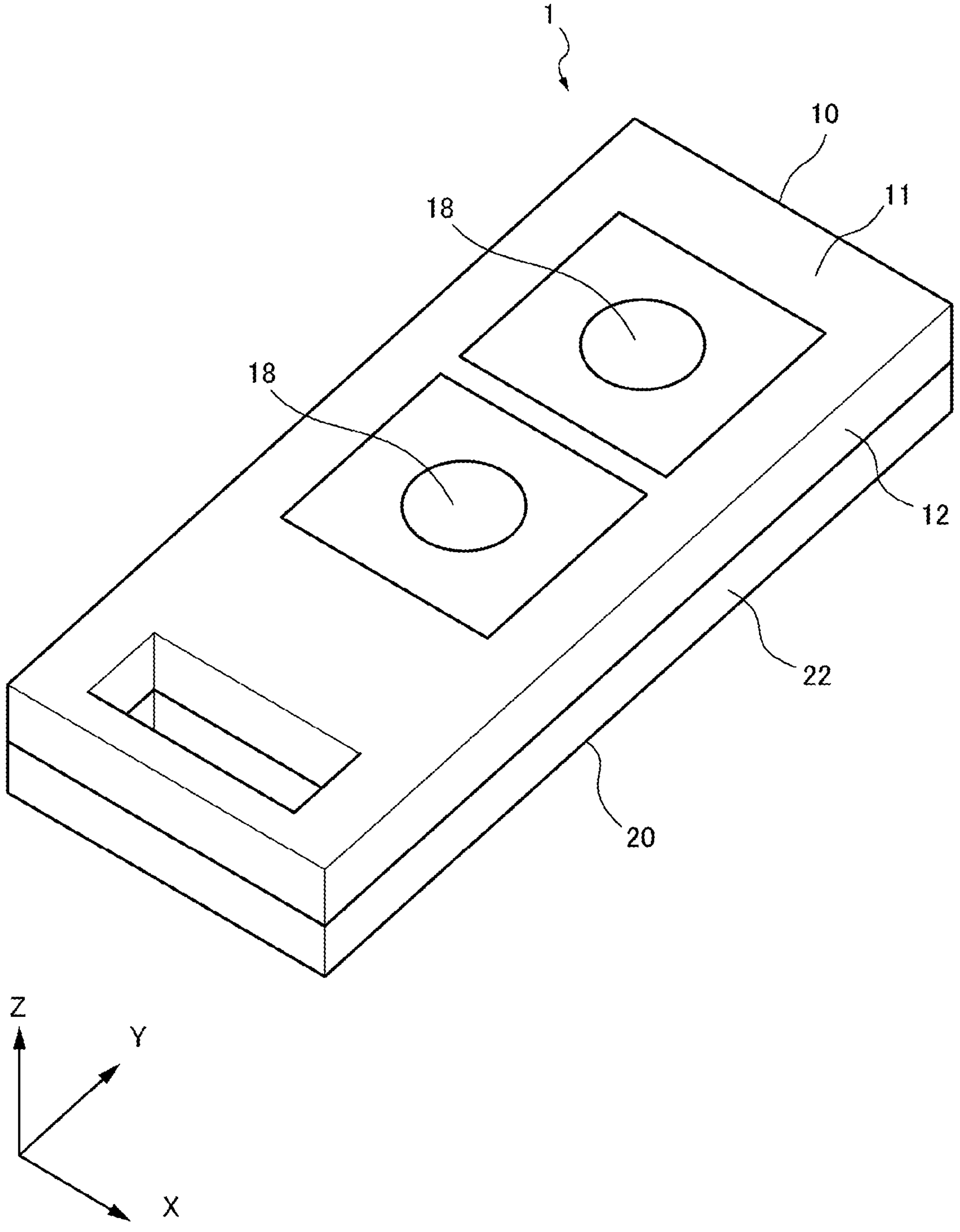
FIG. 1 is a perspective view of an electronic key terminal for a vehicle according to a first embodiment.
Figure 2:
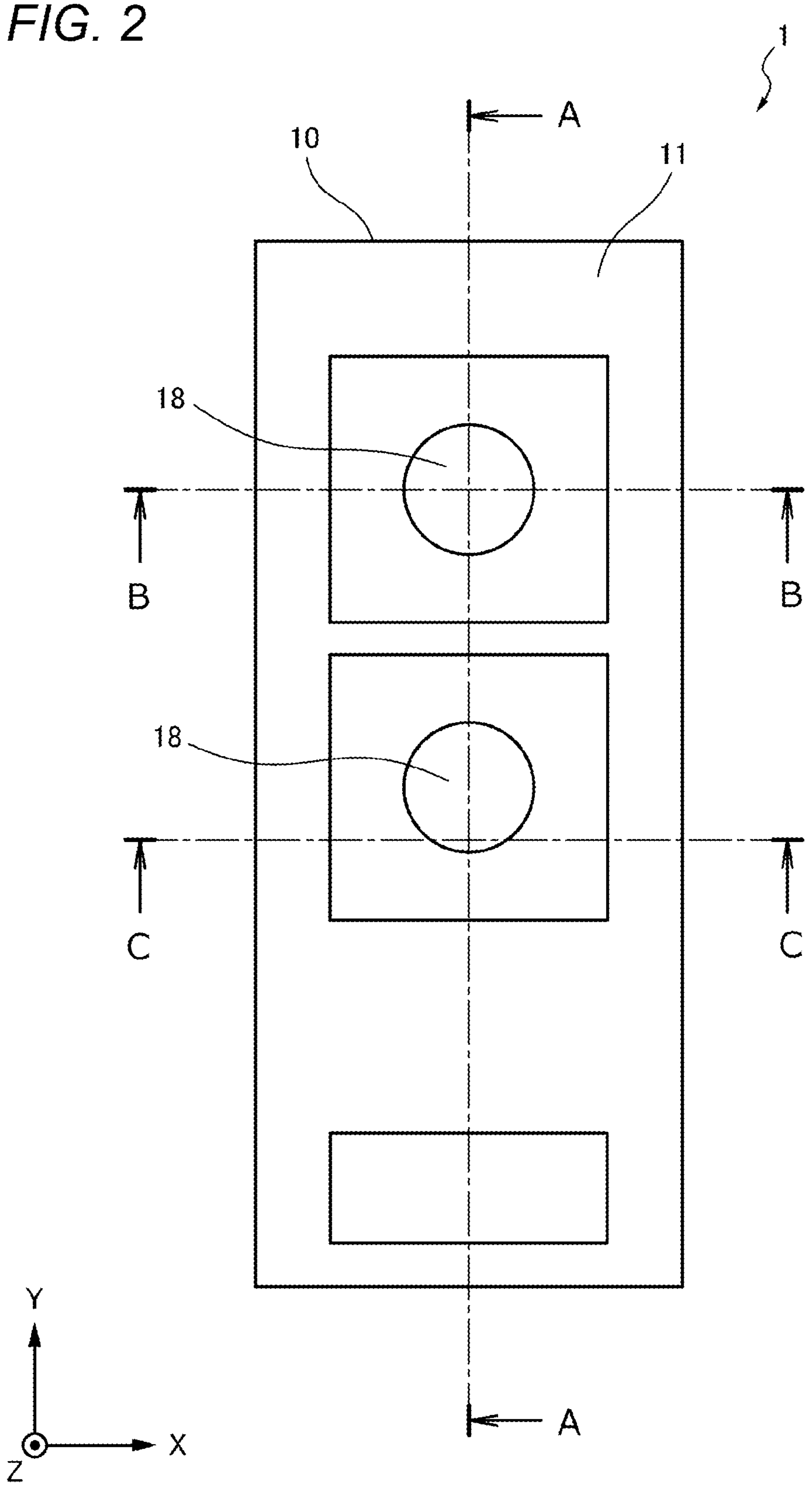
FIG. 2 is a top view of the electronic key terminal for a vehicle according to the first embodiment.
Figure 3:
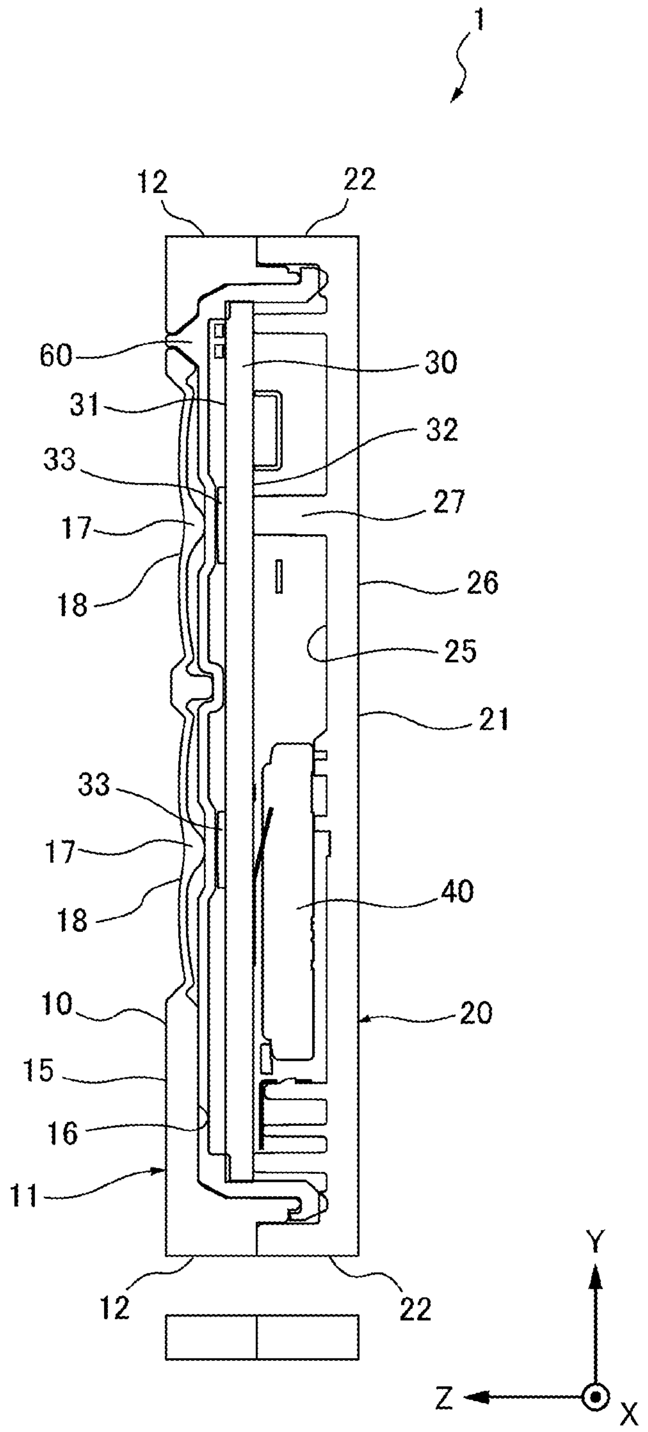
FIG. 3 is a cross-sectional view of the electronic key terminal for a vehicle taken along a line A-A of FIG. 2.
Figure 4:
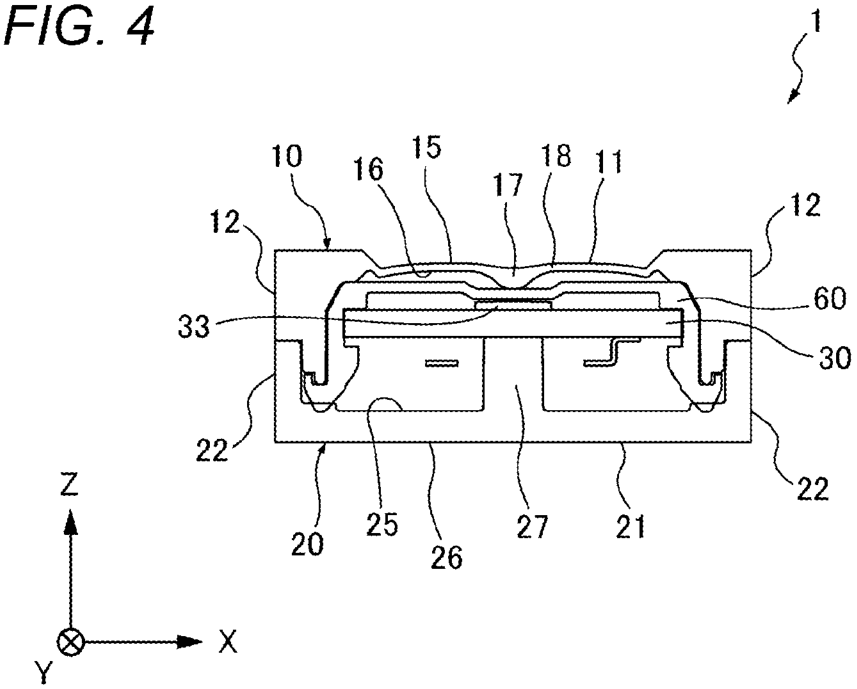
FIG. 4 is a cross-sectional view of the electronic key terminal for a vehicle taken along a line B-B of FIG. 2.
Figure 5:
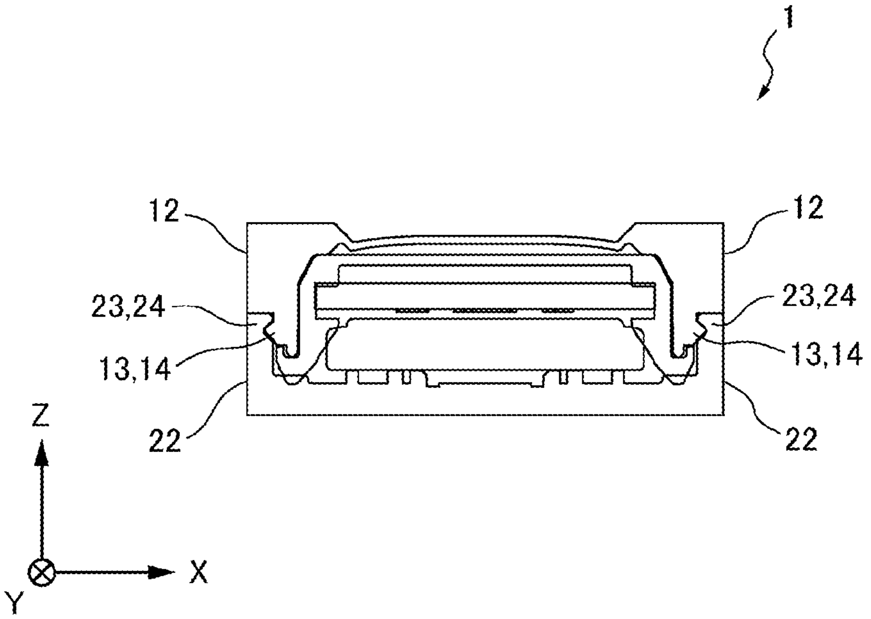
FIG. 5 is a cross-sectional view of the electronic key terminal for a vehicle taken along a line C-C of FIG. 2.
Figure 6:
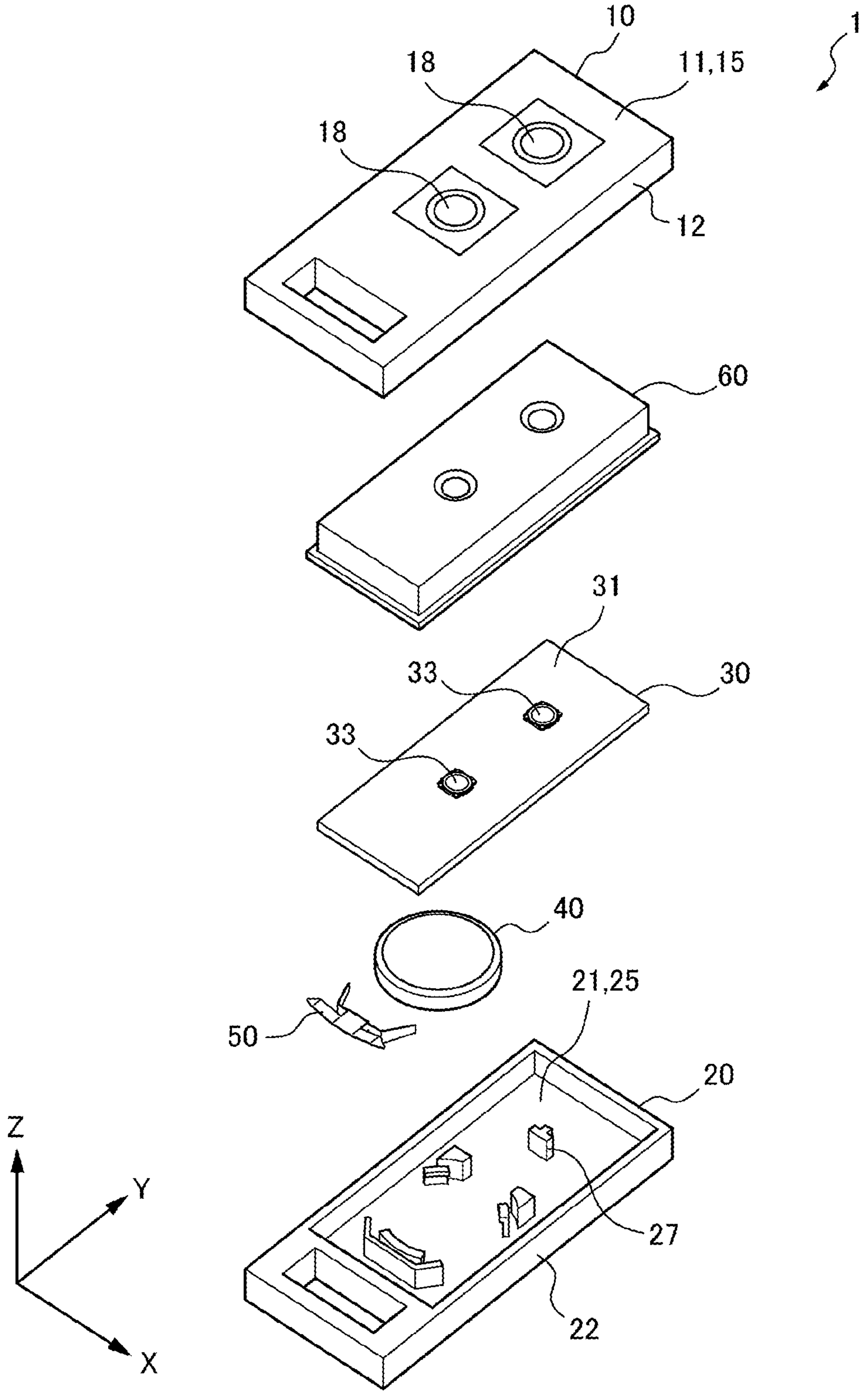
FIG. 6 is an exploded perspective view of the electronic key terminal for a vehicle according to the first embodiment as viewed from above.
Figure 7:
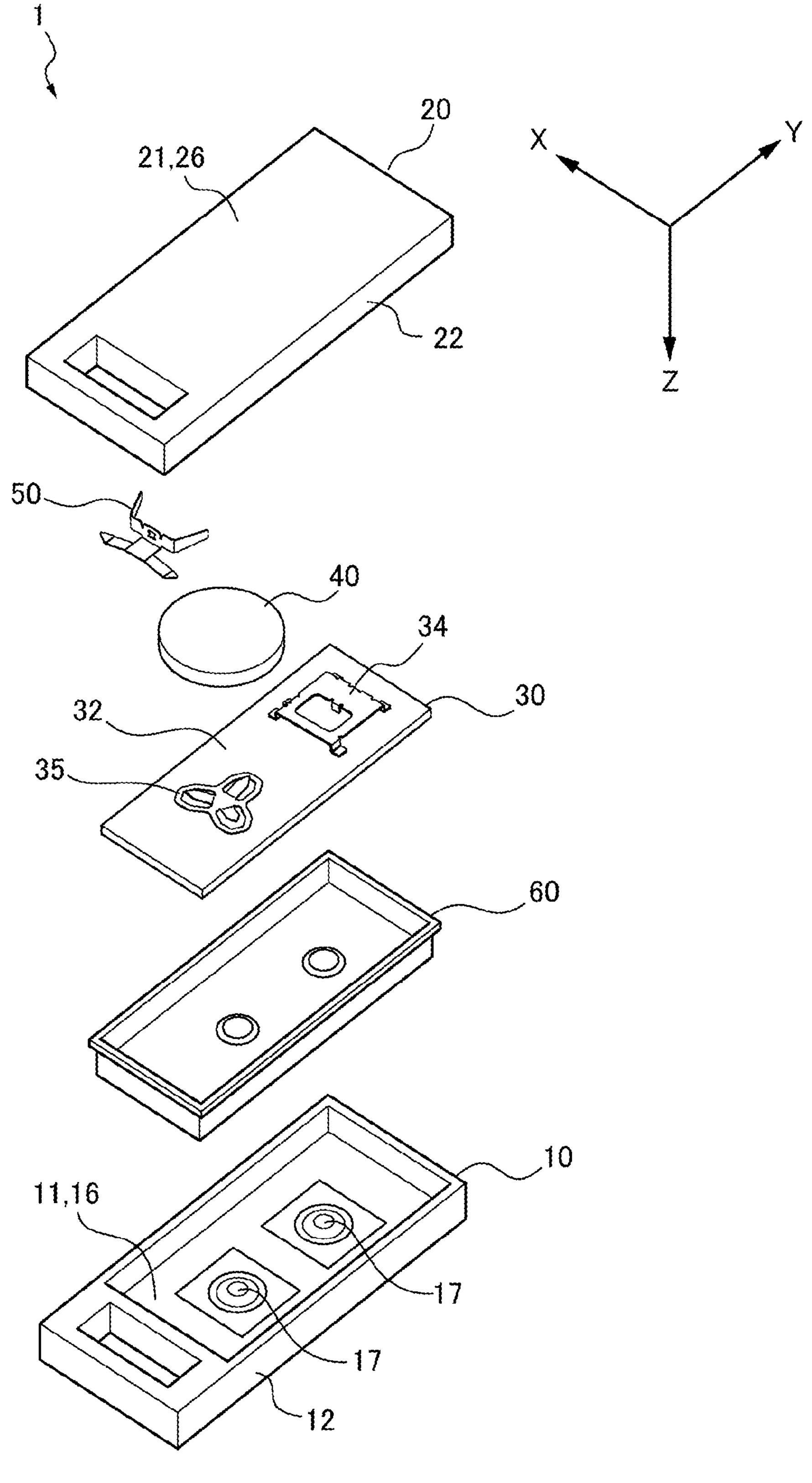
FIG. 7 is an exploded perspective view of the electronic key terminal for a vehicle according to the first embodiment as viewed from below.

FIG. 1 is a perspective view of the electronic key terminal for a vehicle according to the first embodiment. FIG. 2 is a top view of the electronic key terminal for a vehicle according to the first embodiment. FIG. 3 is a cross-sectional view of the electronic key terminal for a vehicle taken along a line A-A of FIG. 2. FIG. 4 is a cross-sectional view of the electronic key terminal for a vehicle taken along a line B-B of FIG. 2. FIG. 5 is a cross-sectional view of the electronic key terminal for a vehicle taken along a line C-C of FIG. 2. FIG. 6 is an exploded perspective view of the electronic key terminal for a vehicle according to the first embodiment as viewed from above. FIG. 7 is an exploded perspective view of the electronic key terminal for a vehicle according to the first embodiment as viewed from below.

An electronic key terminal 1 for a vehicle transmits an electromagnetic wave including a predetermined wireless signal, and changes a behavior of the vehicle by propagating the electromagnetic wave to the vehicle. The vehicle may be a motorcycle. However, the motorcycle is an example, and the vehicle may be a one-wheeled vehicle, a three-wheeled vehicle, a four-wheeled vehicle, or an automobile having five or more wheels. The electronic key terminal 1 may be replaced with another term such as a smart key or a key fob.

For example, when the vehicle receives a predetermined wireless signal from the electronic key terminal 1 located within a predetermined range from a position of the vehicle, the vehicle permits unlocking of a steering wheel of the vehicle and starting of an engine. Accordingly, a driver of the vehicle can unlock the steering wheel of the vehicle and start the engine only by holding the electronic key terminal 1 and approaching the vehicle without inserting a physical key into the vehicle. When the vehicle does not receive a predetermined wireless signal from the electronic key terminal 1, the vehicle may automatically lock the steering wheel and prohibit the engine from being started.

As shown in FIG. 1, the electronic key terminal 1 has a flat, substantially rectangular parallelepiped shape. However, a shape of the electronic key terminal 1 is not limited to a substantially rectangular parallelepiped, and may be, for example, a substantially cube, a substantially ellipsoid, or the like.

For convenience of description, as shown in the drawings, an axis extending in a lateral direction of the electronic key terminal 1 is defined as an X axis, an axis perpendicular to the X axis and extending in a longitudinal direction of the electronic key terminal 1 is defined as a Y axis, and an axis perpendicular to the X axis and the Y axis is defined as a Z axis. For convenience of description, a positive direction of the Z axis may be referred to as "up", a negative direction of the Z axis may be referred to as "down", a positive direction of the X axis may be referred to as "right", a negative direction of the X axis may be referred to as "left", a negative direction of the Y axis may be referred to as "rear", and a positive direction of the Y axis may be referred to as "front". The expressions related to these directions are used for convenience of description and are not intended to limit the posture of the structure in actual use.

The electronic key terminal 1 includes a first case 10, a second case 20, an electronic board 30, a battery 40, a first battery contact 50, and a sheet portion 60.

The first case 10 constitutes an upper portion of a case of the electronic key terminal 1. The first case 10 includes a first planar portion 11 forming a main surface and a first wall portion 12 forming a side surface.

The second case 20 constitutes a lower portion of the case of the electronic key terminal 1. The second case 20 includes a second planar portion 21 constituting a main surface and a second wall portion 22 constituting a side surface.

The first case 10 and the second case 20 are disposed such that the first planar portion 11 and the second planar portion 21 face each other.

The first wall portion 12 of the first case 10 extends from a periphery of the first planar portion 11 toward the second case 20 (that is, downward). A first end portion 13 near a lower end of the first wall portion 12 is provided with a first locking portion 14.

The second wall portion 22 of the second case 20 extends from a periphery of the second planar portion 21 toward the first case 10 (that is, upward). A second end portion 23 near an upper end of the second wall portion 22 is provided with a second locking portion 24 locked to the first locking portion 14.

By locking the first locking portion 14 of the first wall portion 12 and the second locking portion 24 of the second wall portion 22, the first case 10 and the second case 20 are engaged and attached. That is, at least a part of the first wall portion 12 of the first case 10 is in contact with the second case 20. In other words, at least a part of the first wall portion 12 of the first case 10 abuts against at least a part of the second wall portion 22 of the second case 20. Accordingly, for example, the second case 20 can be separated from the first case 10 to replace the battery 40, and the second case 20 can be engaged with and attached to the first case 10 again.

The electronic board 30 has a substantially rectangular flat plate shape, and is housed in a space defined by the first case 10 and the second case 20. The electronic board 30 has a front surface 31 (first surface) that is a surface on a side of the first planar portion 11, and a back surface 32 (second surface) that is a surface on a side of the second planar portion 21.

A switch 33 and an electronic circuit (not shown) are provided on the front surface 31 of the electronic board 30. The switch 33 is connected to the electronic circuit.

An antenna 34 and a second battery contact 35 are provided on the back surface 32 of the electronic circuit. The antenna 34 and the second battery contact 35 are connected to the electronic circuit.

The first battery contact 50 is disposed along the back surface 32 of the electronic board 30. The first battery contact 50 is connected to the electronic circuit.

The battery 40 is, for example, a button battery, and is disposed along the back surface 32 of the electronic board 30 so as to be in contact with the first battery contact 50 and the second battery contact 35. Incidentally, the battery 40 may be disposed along the front surface 31 of the electronic board 30. The battery 40 supplies electric power to the electronic circuit.

The electronic circuit operates by the electric power supplied from the battery 40, and transmits an electromagnetic wave from the antenna 34. The antenna 34 may receive an electromagnetic wave transmitted from the vehicle. Bluetooth (registered trademark) Low Energy (LE) may be used as a wireless signal transmitted and received between the electronic key terminal 1 and the vehicle. Hereinafter, Bluetooth LE is referred to as "BLE". Incidentally, the BLE is an example, and a low frequency (LF) signal or a radio frequency (RF) signal may be used as a wireless signal transmitted and received between the electronic key terminal 1 and the vehicle.

When the electronic circuit detects that the switch 33 is depressed, the electronic circuit implements a predetermined function assigned to the switch 33. For example, in a case where a function of switching power of the electronic key terminal 1 between ON and OFF is assigned to the switch 33, when the electronic circuit detects that the switch 33 is depressed, the electronic circuit switches the power of the electronic key terminal 1 to OFF if the power of the electronic key terminal 1 is in an ON state, and switches the power of the electronic key terminal 1 to ON if the power of the electronic key terminal 1 is in an OFF state. By turning off the power of the electronic key terminal 1, wireless communication between the electronic key terminal 1 and the vehicle can be stopped. For example, in a case where an answerback function of the vehicle is assigned to the switch 33, when the electronic circuit detects that the switch 33 is depressed, the electronic circuit transmits a wireless signal (electromagnetic wave) instructing answerback to the vehicle from the antenna 34. The vehicle that receives the wireless signal instructing the answerback from the electronic key terminal 1 performs an answerback operation. Examples of the answerback operation include blinking a lamp or producing a sound. In a case where the vehicle is an automobile having a door, a function of switching between locking and unlocking of the door of the vehicle may be assigned to the switch 33. Details of the configuration of the electronic circuit will be described later (see FIG. 8).

The sheet portion 60 has waterproof performance and is disposed between the first planar portion 11 of the first case 10 and the switch 33 of the electronic board 30. The sheet portion 60 may be disposed so as to cover the electronic board 30 from above. Accordingly, even if the electronic board 30 is damaged so as to penetrate the first planar portion 11 of the first case 10, it is possible to prevent the electronic board 30 from getting wet with water.

The first planar portion 11, the second planar portion 21, the electronic board 30, and at least a part of the sheet portion 60 are disposed along a predetermined plane (for example, an XY plane). For example, the first planar portion 11, the second planar portion 21, the electronic board 30, and at least a part of the sheet portion 60 are disposed so as to be substantially parallel to each other.

The first planar portion 11 of the first case 10 has an upper surface 15 (first surface) that is a surface on a side opposite to the electronic board 30, and a lower surface 16 (second surface) that is a surface on a side of the electronic board 30.

The second planar portion 21 of the second case 20 has an upper surface 25 that is a surface on a side of the electronic board 30, and a lower surface 26 that is a surface on a side opposite to the electronic board 30.

A protrusion portion 17 protruding toward the switch 33 of the electronic board 30 is provided on the lower surface 16 of the first planar portion 11 of the first case 10. The protrusion portion 17 may be replaced with another term such as a pusher or a pusher pin.

A board support portion 27 that supports the electronic board 30 is provided on the upper surface 25 of the second planar portion 21 of the second case 20. The board support portion 27 may be disposed at least corresponding to a position of the switch 33. For example, the switch 33 and the board support portion 27 may be disposed in a line in a Z-axis direction.

The first planar portion 11 of the first case 10 and at least a part of the first wall portion 12 of the first case 10 may be made of a uniform material. For example, the first case 10 may be made of an elastic resin. At least a part of the first case 10 may be made of metal.

The second case 20 may be made of a resin harder than that of the first case 10. At least a part of the second case 20 may be made of metal.

For example, the first case 10 may be made of an elastomer. The second case 20 may be made of an alloy material of polycarbonate and polyethylene terephthalate. The sheet portion 60 may be made of silicon rubber. That is, an elastic modulus of the first planar portion 11 of the first case 10 may be smaller than an elastic modulus of the second case 20 and larger than an elastic modulus of the sheet portion 60. For example, the first case 10 may be bent about ten times more easily than the second case 20. The sheet portion 60 may be about three times softer than the first case 10.

In the protrusion portion 17 of the first planar portion 11 of the first case 10, a thickness between the upper surface 15 and the lower surface 16 of the first planar portion 11 may continuously change along the predetermined plane (for example, the XY plane). For example, the protrusion portion 17 may be formed so as to have a smooth curve from a top portion having the largest thickness toward a foot portion having the smallest thickness.

In the first case 10, a thickness of at least a part of the first planar portion 11 may be thinner than a thickness of the first wall portion 12. For example, a thickness of a part of the first planar portion 11 where the protrusion portion 17 is provided may be thinner than the thickness of the first wall portion 12. Hereinafter, the portion of the first planar portion 11 where the protrusion portion 17 is provided is referred to as a button portion 18. In this way, the button portion 18 and the protrusion portion 17 may be integrally formed as a part of the first planar portion 11 of the first case 10. Accordingly, the number of components can be reduced and the manufacturing cost of the electronic key terminal 1 can be reduced as compared with a case where the button portion or the protrusion portion is configured as a separate body.

<Operation of Electronic Key Terminal for Vehicle>

Next, an operation when the button portion 18 is depressed in the electronic key terminal 1 for a vehicle shown in FIGS. 1 to 7 will be described.

When a user depresses the button portion 18 of the first planar portion 11 of the first case 10, a thin portion around the button portion 18 is curved, and the button portion 18 and the protrusion portion 17 are depressed downward. The portion around the button portion 18 is a part of the first planar portion 11, but as described above, the button portion 18 is formed of a material that is sufficiently easily bent (that is, the elastic modulus is small) and is sufficiently thin, and thus is easily bent by a force of the user. Further, as described above, since the second case 20 is made of a sufficiently hard material (that is, the elastic modulus is large), the second case 20 is not easily curved by the force of the user. Accordingly, the button portion 18 can be depressed by the first case 10 having a small elastic modulus while the rigidity of the entire electronic key terminal 1 is maintained by the second case 20 having a large elastic modulus. In addition, since the first case 10 is made of a material that is sufficiently easily bent, a crack is less likely to occur in the first planar portion 11 even when the button portion 18 is repeatedly depressed.

The protrusion portion 17 depressed together with the button portion 18 depresses the switch 33 via the sheet portion 60. Here, since a thickness of the protrusion portion 17 continuously (smoothly) changes from the top portion toward the foot portion as described above, a stress applied to the sheet portion 60 by the protrusion portion 17 is dispersed. Accordingly, even when the button portion 18 is repeatedly pressed, a part of the sheet portion 60 against which the pressed protrusion portion 17 abuts is not easily damaged. As described above, since the sheet portion 60 is made of a material that is sufficiently easily bent, the sheet portion 60 deforms in accordance with the depression of the protrusion portion 17, and can depress the switch 33.

The electronic circuit of the electronic board 30 may detect that the switch 33 is depressed and implement a predetermined function as described above.

In this way, according to the embodiment, the number of components of the electronic key terminal 1 for a vehicle can be reduced, and the manufacturing cost of the electronic key terminal 1 can be reduced. In addition, a risk of damage to the waterproof sheet portion 60 can be reduced.

<Block Configuration of Wireless System>

Figure 8:
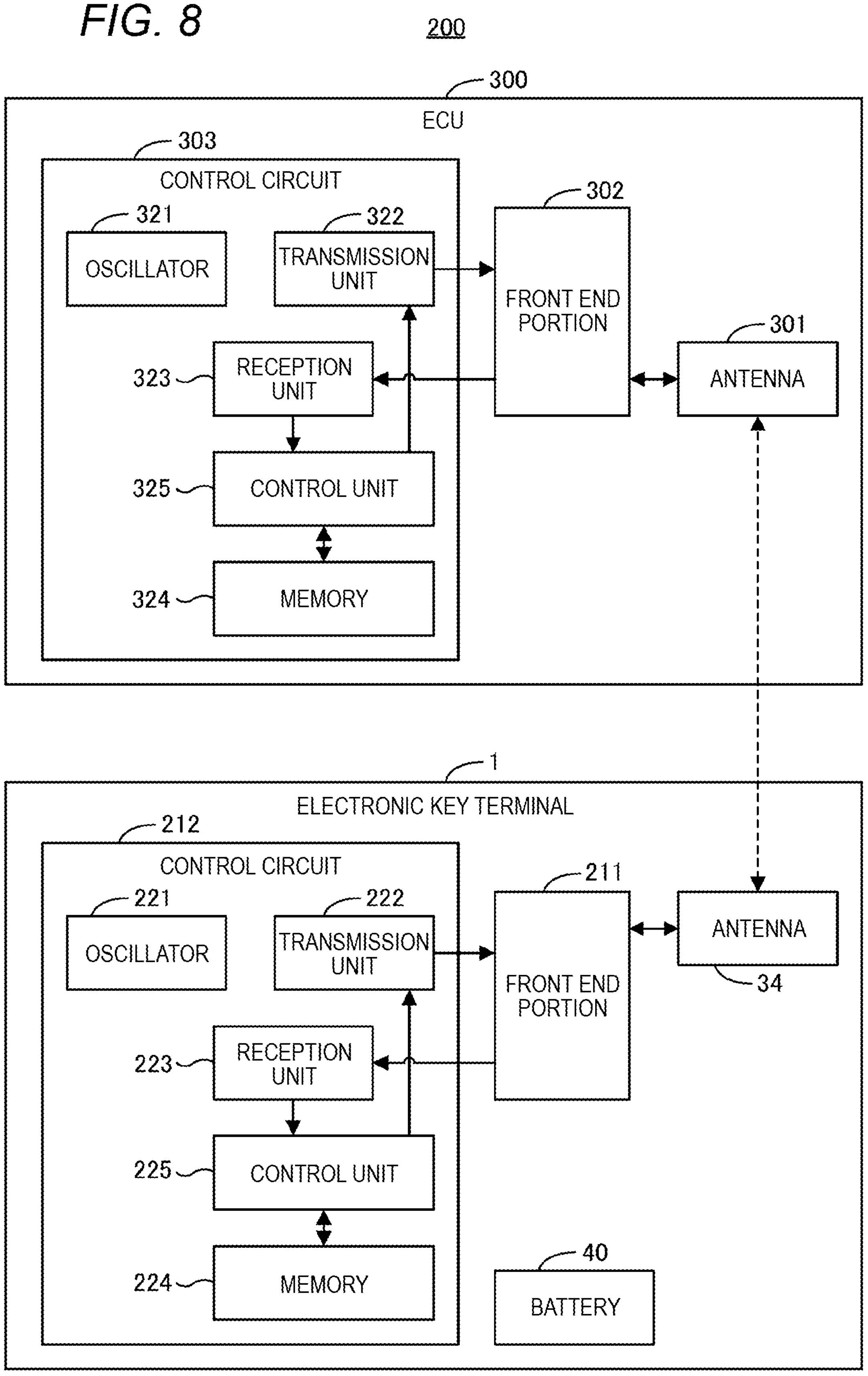
FIG. 8 is a block diagram showing a schematic configuration of a wireless system according to the first embodiment.

FIG. 8 is a block diagram showing a schematic configuration of a wireless system according to the first embodiment.

As shown in FIG. 8, a wireless system 200 includes the electronic key terminal 1 described above and an electronic control unit (ECU) 300 mounted on the vehicle.

The electronic key terminal 1 described above is registered in the ECU 300 in advance so as to be paired with the ECU 300 mounted on the vehicle. For example, Bluetooth LE (BLE) is used for communication between the electronic key terminal 1 and the ECU 300. A frequency used in BLE is a 2.4 GHz band, and a communication distance is about 100 m.

<<Electronic Key Terminal>>

In FIG. 8, the electronic key terminal 1 includes an antenna 34, a front end portion 211, and a control circuit 212 as the electronic circuit on the electronic board 30. In addition, the electronic key terminal 1 includes the battery 40 that supplies electric power to the electronic circuit.

The antenna 34 is, for example, one dipole antenna. The antenna 34 is not limited to a dipole antenna, and may include a plurality of antenna elements.

The front end portion 211 performs amplification of a weak signal, conversion from a high frequency to a low frequency, prevention of wraparound of a transmission signal to a reception unit side, or the like.

The control circuit 212 includes an oscillator 221, a transmission unit 222, a reception unit 223, a memory 224, and a control unit 225.

The oscillator 221 is a local oscillator that generates a carrier signal. The transmission unit 222 generates a radio wave from IQ data (baseband signal) to be transmitted, and transmits the generated radio wave from the antenna 34 via the front end portion 211. The reception unit 223 acquires the radio wave received by the antenna 34 via the front end portion 211, extracts the IQ data from the acquired radio wave, and detects a received signal strength indication (RSSI).

The control unit 225 performs control to transmit the radio wave through the transmission unit 222. The control unit 225 performs control to detect the RSSI of the radio wave received through the reception unit 223 and store the detected RSSI in the memory 224. The control unit 225 may acquire a distance between the vehicle and the electronic key terminal 1 based on the detected RSSI of the radio wave. The control unit 225 may notify the ECU 300 of the vehicle of the detected RSSI of the radio wave. Accordingly, the ECU 300 of the vehicle can acquire the distance between the vehicle and the electronic key terminal 1 by using the RSSI of the radio wave notified from the electronic key terminal 1.

The control unit 225 includes a processor (not shown), a read only memory (ROM) storing a program for controlling the processor, and a random access memory (RAM) used for an operation of the processor. The processor may be read as a central processing unit (CPU), an integrated circuit, a large scale integrated circuit (LSI), a controller, an application specific integrated circuit (ASIC), a field programmable gate array (FPGA), or the like. The memory 224 may be either a volatile memory or a nonvolatile memory (for example, a flash memory).

<<ECU>>

In FIG. 8, the ECU 300 mounted on the vehicle includes an antenna 301, a front end portion 302, and a control circuit 303.

The antenna 301 is, for example, one dipole antenna. The antenna 301 is not limited to a dipole antenna, and may include a plurality of antenna elements.

Similar to the front end portion 211 of the electronic key terminal 1 described above, the front end portion 302 performs amplification of a weak signal, conversion from a high frequency to a low frequency, prevention of wraparound of a transmission signal to a reception unit side, or the like.

The control circuit 303 includes an oscillator 321, a transmission unit 322, a reception unit 323, a memory 324, and a control unit 325.

The oscillator 321 is a local oscillator that generates a carrier signal, similar to the oscillator 221 of the control circuit 212 of the electronic key terminal 1 described above. The transmission unit 322 performs control to generate a radio wave from IQ data (baseband signal) to be transmitted and transmit the generated radio wave from the antenna 301 via the front end portion 302. The reception unit 323 acquires the radio wave received by the antenna 301 via the front end portion 302, extracts the IQ data from the acquired radio wave, and detects a received signal strength indication (RSSI).

The control unit 325 performs control to transmit the radio wave through the transmission unit 322. The control unit 325 performs control to detect the RSSI of the radio wave received through the reception unit 323 and store the detected RSSI in the memory 324. The control unit 325 may acquire a distance between the vehicle and the electronic key terminal 1 based on the RSSI of the received radio wave.

After calculating the distance between the vehicle and the electronic key terminal 1, the control unit 325 changes a behavior of the vehicle according to the calculated distance. For example, when the distance between the vehicle and the electronic key terminal 1 is equal to or greater than a predetermined value, the ECU 300 may not accept an operation of the electronic key terminal 1, and when the distance is equal to or less than the predetermined value, the ECU 300 may accept the operation of the electronic key terminal 1. When the distance between the vehicle and the electronic key terminal 1 is the predetermined value, the ECU 300 may or may not receive the operation of the electronic key terminal 1.

Similar to the control unit 225 of the electronic key terminal 1, the control unit 325 includes a processor (not shown), a ROM storing a program for controlling the processor, and a RAM used for an operation of the processor. The memory 324 may be either a volatile memory or a nonvolatile memory (for example, a flash memory).

Second Embodiment

Figure 9A:
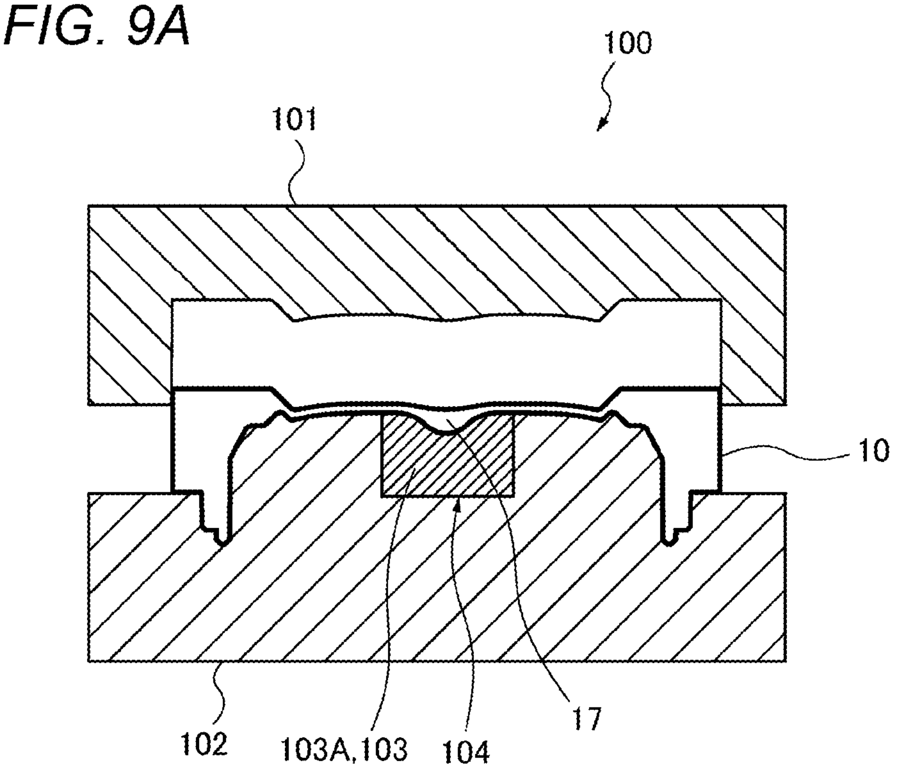
FIGS. 9A and 9B are cross-sectional views showing an example of a structure of a mold set according to a second embodiment.
Figure 9B:
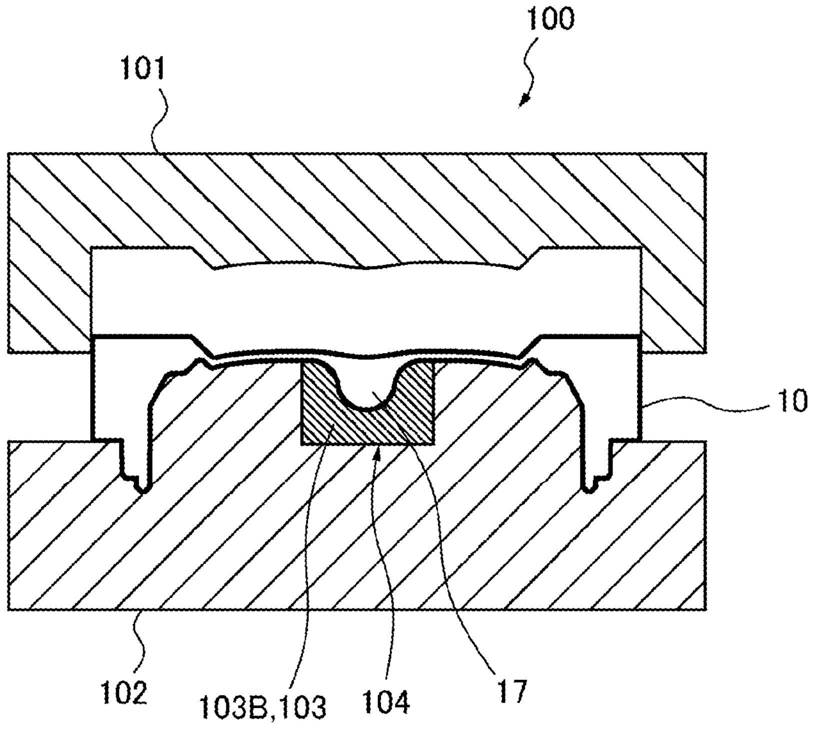

FIGS. 9A and 9B are cross-sectional views showing an example of a structure of a mold set 100 according to a second embodiment.

The mold set 100 according to the second embodiment is a mold set for injection molding of the first case 10 described in the first embodiment. The mold set 100 includes an upper mold 101, a lower mold 102, and a mold piece 103.

The upper mold 101 is a mold having a shape for molding the upper surface 15 of the first case 10. The upper mold 101 may be read as a first mold.

The lower mold 102 is a mold having a shape for molding the lower surface 16 of the first case 10 and having a recess portion 104 for fitting the mold piece 103 in a portion corresponding to the protrusion portion 17 of the first case 10. The lower mold 102 may be read as a second mold.

The mold piece 103 is a mold that can be fitted into the recess portion 104 of the lower mold 102 and has a shape for molding the protrusion portion 17 of the first case 10.

As shown in FIGS. 9A and 9B, the mold piece 103 may be prepared for each protrusion portion 17 having at least one of a different size and a different shape. Accordingly, by replacing the mold piece 103 fitted into the recess portion 104, the first case 10 having the protrusion portion 17 having at least one of a different size and a different shape can be easily injection molded.

For example, when the electronic key terminal 1 is manufactured for a user who prefers the button portion 18 having a relatively deep depression depth, as shown in FIG. 9A, the first case 10 is manufactured using a mold piece 103A in which a thickness of a top portion of the protrusion portion 17 is formed to be relatively thin. For example, when the electronic key terminal 1 is manufactured for a user who prefers the button portion 18 having a relatively shallow depression depth, as shown in FIG. 9B, the first case 10 is manufactured using a mold piece 103B in which a thickness of a top portion of the protrusion portion 17 is formed to be relatively thick.

In this way, according to the present embodiment, the electronic key terminal 1 for a vehicle having a different size and/or shape of the protrusion portion 17 of the first case 10 can be easily manufactured only by replacing the mold piece 103.

(A-1) An electronic key terminal for a vehicle including:

a first case having a first planar portion disposed along a predetermined plane;

a second case having a second planar portion disposed along the predetermined plane, at least a part of the second case being in contact with the first case;

an electronic board disposed along the predetermined plane, housed in a space defined by the first case and the second case, and having a first surface on a side of the first planar portion and a second surface on a side of the second planar portion; and a switch disposed on the first surface of the electronic board, in which the first planar portion of the first case includes a first surface on a side opposite to the electronic board and a second surface on a side of the electronic board, the second surface of the first planar portion of the first case has a protrusion portion protruding toward the switch of the electronic board, and an elastic modulus of the first planar portion of the first case is smaller than an elastic modulus of the second case.

(A-2) The electronic key terminal for a vehicle according to (A-1), further including:

a sheet portion, at least a part of the sheet portion being disposed along the predetermined plane between the first planar portion of the first case and the switch of the electronic board, in which the elastic modulus of the first planar portion of the first case is smaller than the elastic modulus of the second case and larger than an elastic modulus of the sheet portion.

(A-3) The electronic key terminal for a vehicle according to (A-1) or (A-2), in which the first case includes a first wall portion extending toward the second case around the first planar portion, and at least a part of the first wall portion of the first case is in contact with the second case.

(A-4) The electronic key terminal for a vehicle according to (A-3), in which a thickness of at least a part of the first planar portion of the first case is thinner than a thickness of the first wall portion of the first case.

(A-5) The electronic key terminal for a vehicle according to (A-3) or (A-4), in which the second case includes a second wall portion extending toward the first case around the second planar portion, and at least a part of the first wall portion of the first case is in contact with at least a part of the second wall portion of the second case.

(A-6) The electronic key terminal for a vehicle according to (A-5), in which at least a part of a first end portion of the first wall portion of the first case abuts against a second end portion of the second wall portion of the second case.

(A-7) The electronic key terminal for a vehicle according to (A-6), in which the first end portion of the first wall portion and the second end portion of the second wall portion each include a locking portion locked to each other.

(A-8) The electronic key terminal for a vehicle according to any one of (A-3) to (A-7), in which the first planar portion of the first case and at least a part of the first wall portion of the first case are made of a uniform material.

(A-9) The electronic key terminal for a vehicle according to any one of (A-1) to (A-8), in which a thickness between the first surface and the second surface of the first planar portion continuously changes along the predetermined plane in the protrusion portion of the first planar portion of the first case.

(A-10) The electronic key terminal for a vehicle according to any one of (A-1) to (A-9), in which the second planar portion of the second case includes a support portion that supports the electronic board.

(A-11) The electronic key terminal for a vehicle according to any one of (A-1) to (A-10), in which the electronic board includes an electronic circuit to which the switch is connected, and a battery that supplies electric power to the electronic circuit is disposed along a first surface and/or a second surface of the electronic board.

(A-12) The electronic key terminal for a vehicle according to (A-11), in which the electronic circuit includes an antenna, and transmits an electromagnetic wave from the antenna in response to an operation of the switch.

(A-13) The electronic key terminal for a vehicle according to (A-12), in which the electromagnetic wave transmitted from the antenna is configured to be propagated to the vehicle.

(A-14) The electronic key terminal for a vehicle according to any one of (A-1) to (A-13), in which the first case is injection molded, and at least one of a size and a shape of the protrusion portion of the second surface of the first planar portion of the first case is changeable by replacing a mold piece having at least one of a size and a shape different from that of the protrusion portion in injection molding.

Third Embodiment

Introduction to Third Embodiment

There is known an electronic key terminal for a vehicle that unlocks or locks a door of the vehicle or permits an engine of the vehicle to start by performing wireless communication with the vehicle.

JP-A-H09-008474 discloses a seal structure of a case, the seal structure of a case including: a case integrally formed by combining an opening portion of an upper case and an opening portion of a lower case; a sealing rubber housed in the case and having a groove portion formed on an inner wall portion over an entire circumference; and a printed circuit board fitted to the groove portion of the inner wall portion of the sealing rubber, in which the sealing rubber is sandwiched between an outer peripheral edge portion of the printed circuit board and the inner wall portion of the case.

The sealing rubber disclosed in JP-A-H09-008474 has a protruding portion over an entire circumference inside the opening portion. Therefore, when the circuit board is attached to the sealing rubber, it is necessary to attach the circuit board to the sealing rubber while expanding the protruding portion by hand, which is not good in workability.

Therefore, in the third embodiment, an electronic key terminal in which a circuit board can be easily attached to an elastic member using rubber as an example will be described.

<Configuration of Electronic Key Terminal>

Figure 10:
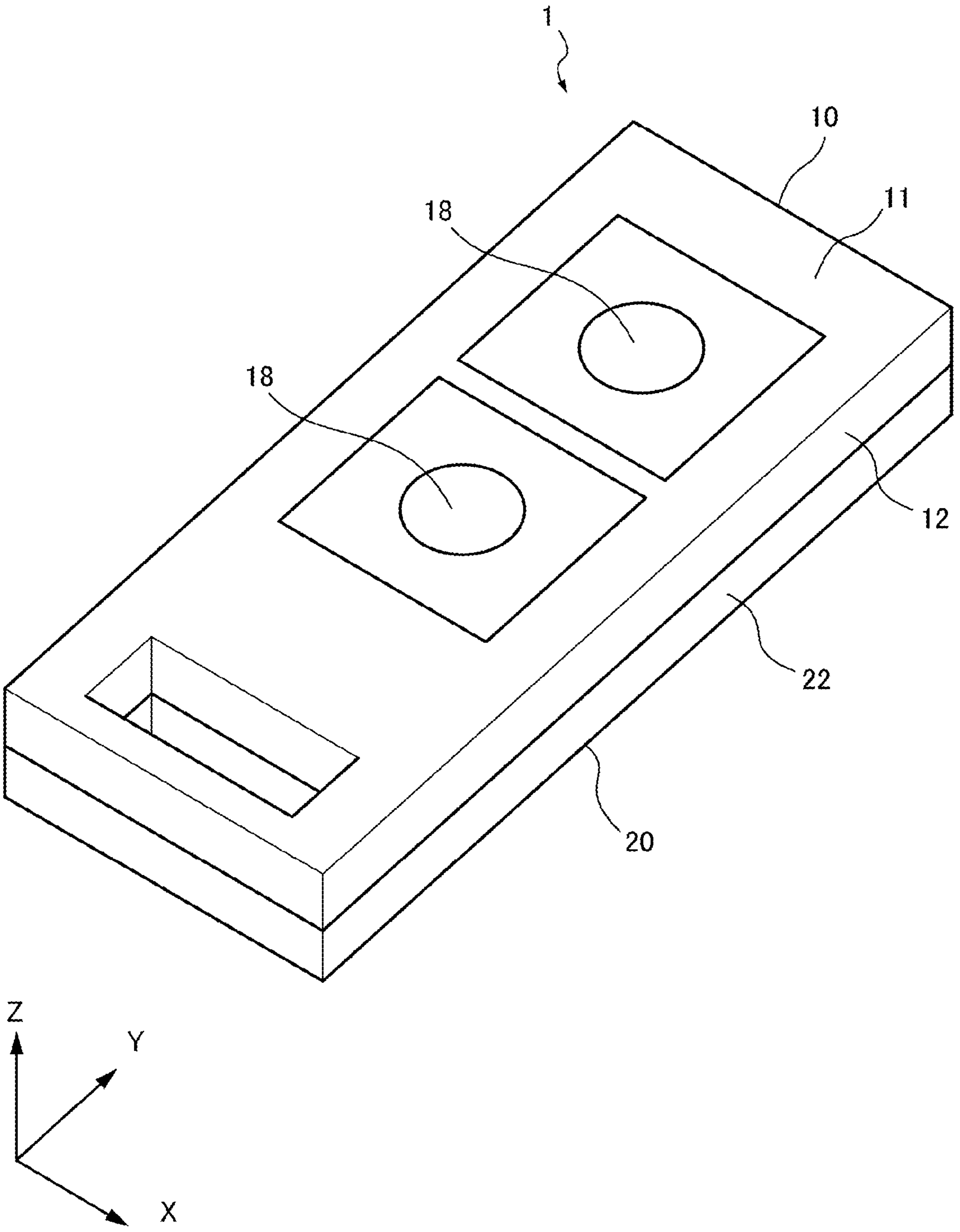
FIG. 10 is a perspective view of an electronic key terminal for a vehicle according to a third embodiment.
Figure 11:
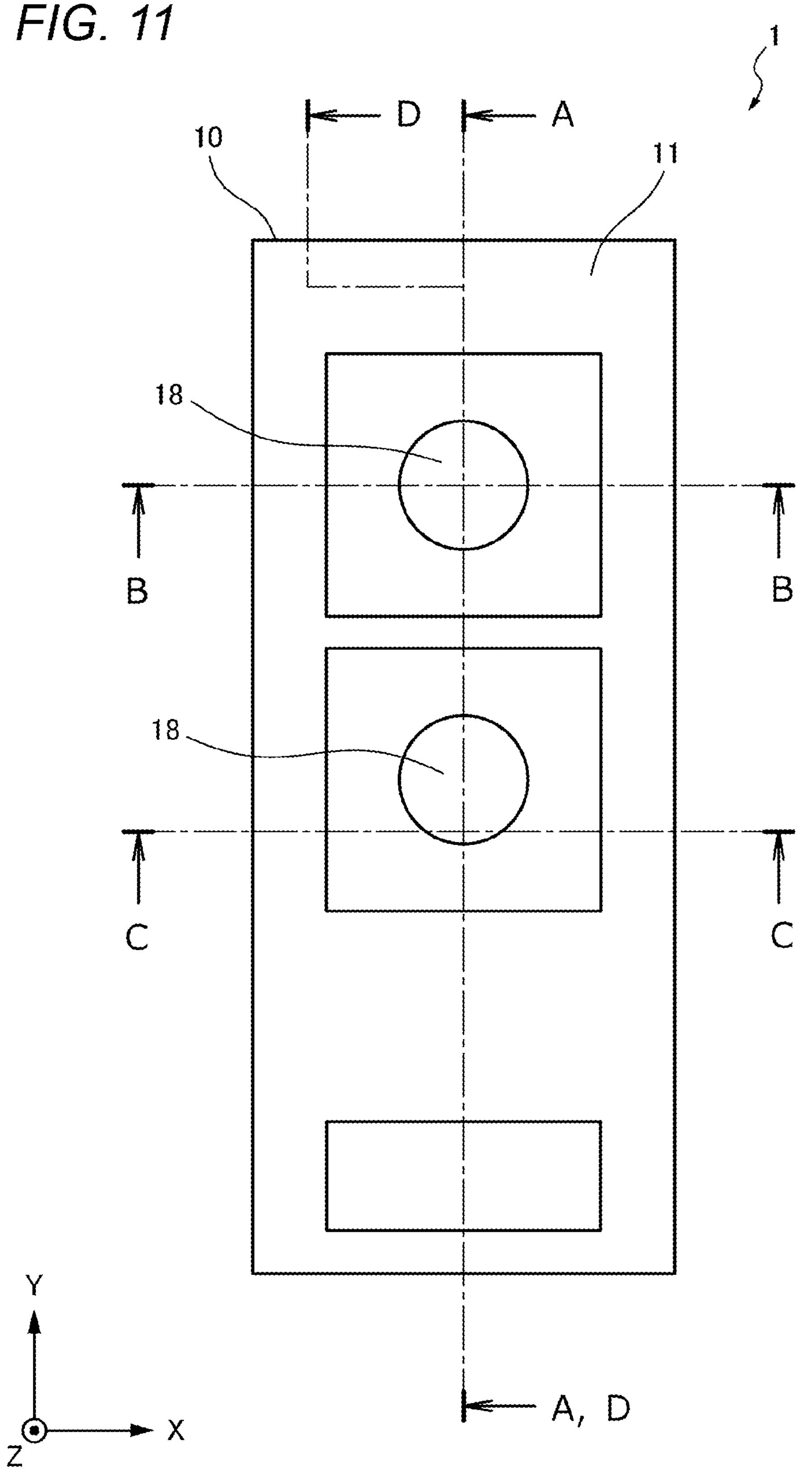
FIG. 11 is a top view of the electronic key terminal for a vehicle according to the third embodiment.
Figure 12:
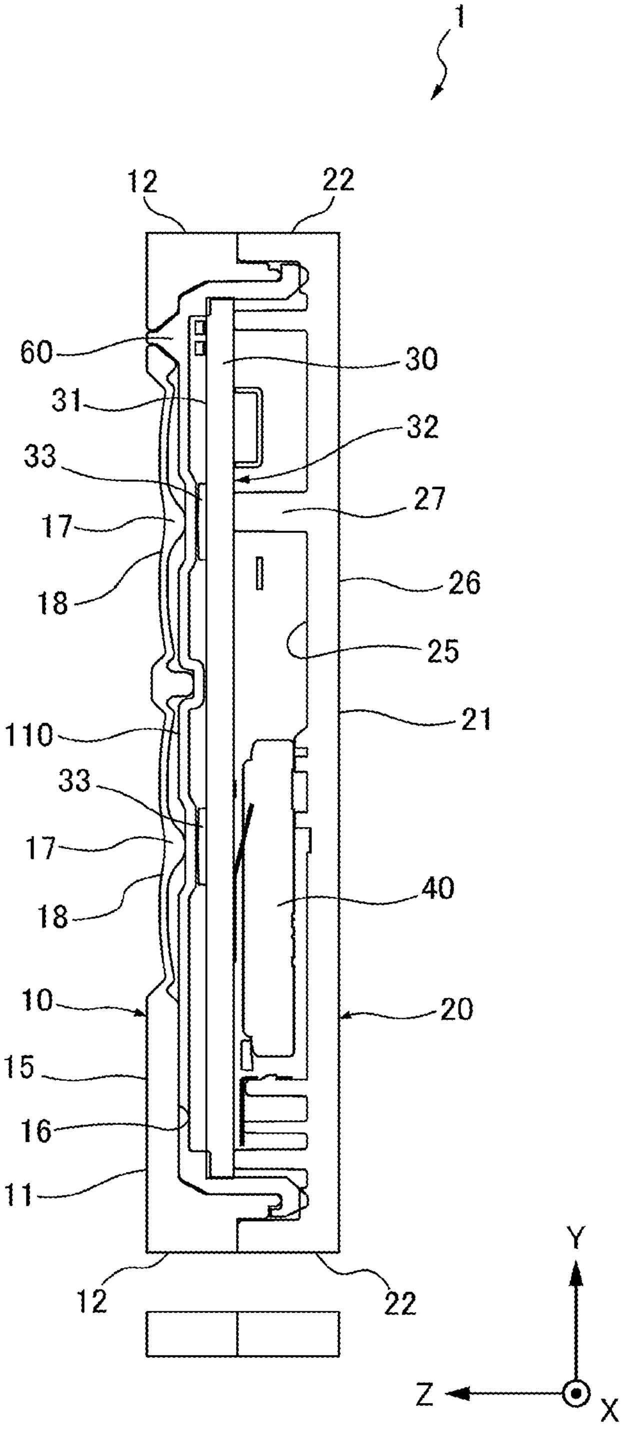
FIG. 12 is a cross-sectional view of the electronic key terminal for a vehicle taken along a line A-A of FIG. 11.
Figure 13:
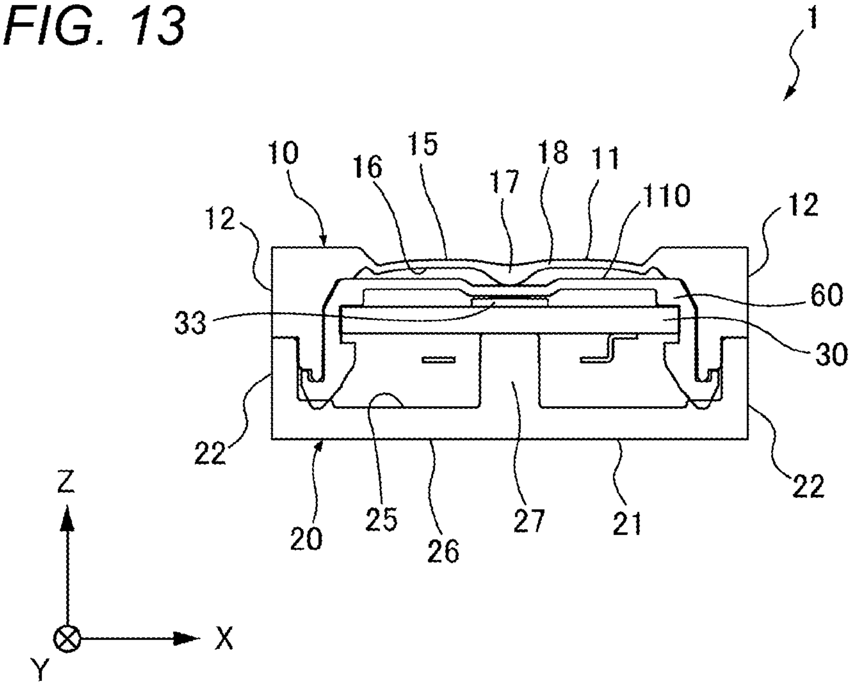
FIG. 13 is a cross-sectional view of the electronic key terminal for a vehicle taken along a line B-B of FIG. 11.
Figure 14:
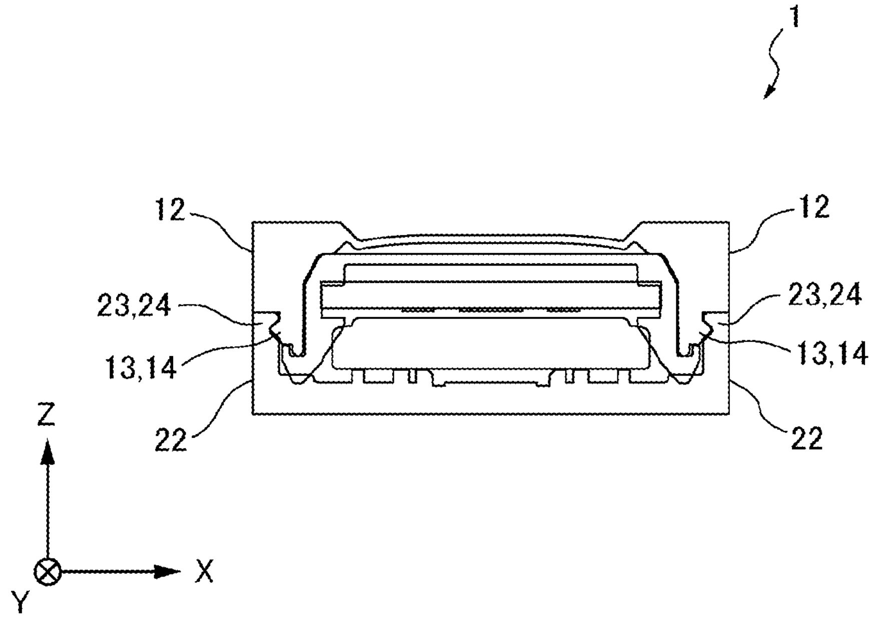
FIG. 14 is a cross-sectional view of the electronic key terminal for a vehicle taken along a line C-C of FIG. 11.
Figure 15:
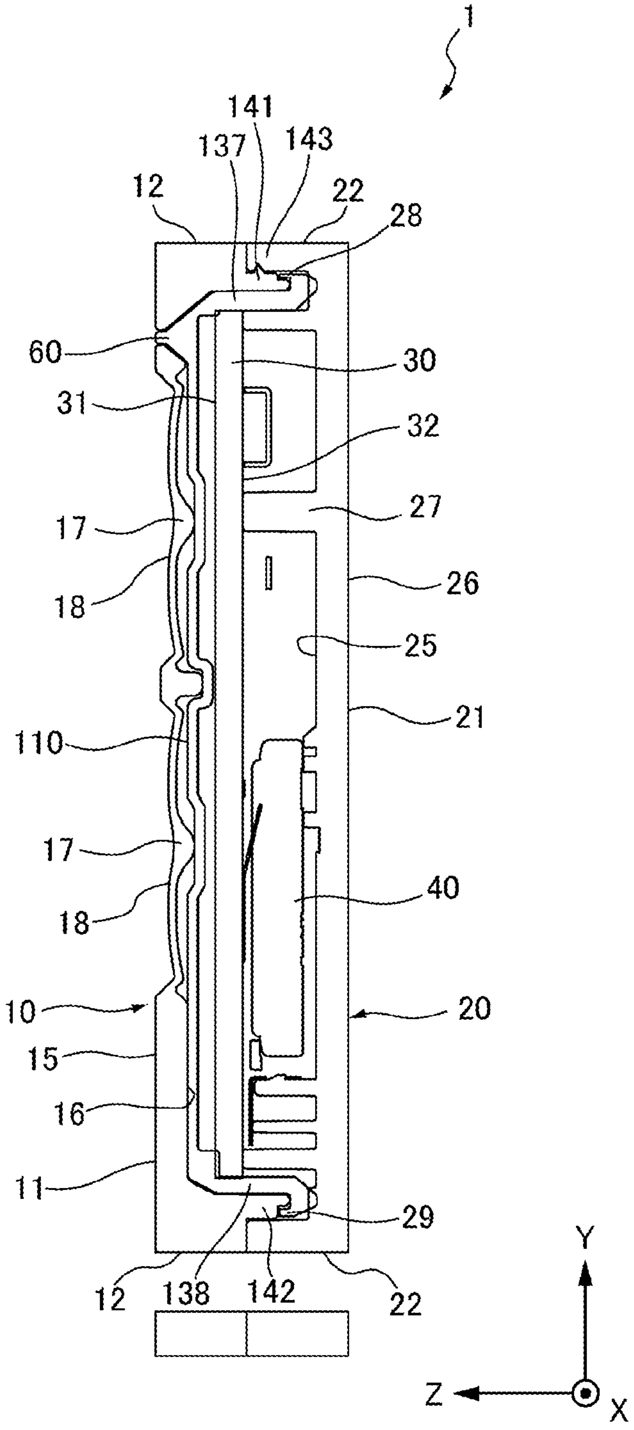
FIG. 15 is a cross-sectional view of the electronic key terminal for a vehicle taken along a line D-D of FIG. 11.
Figure 16:
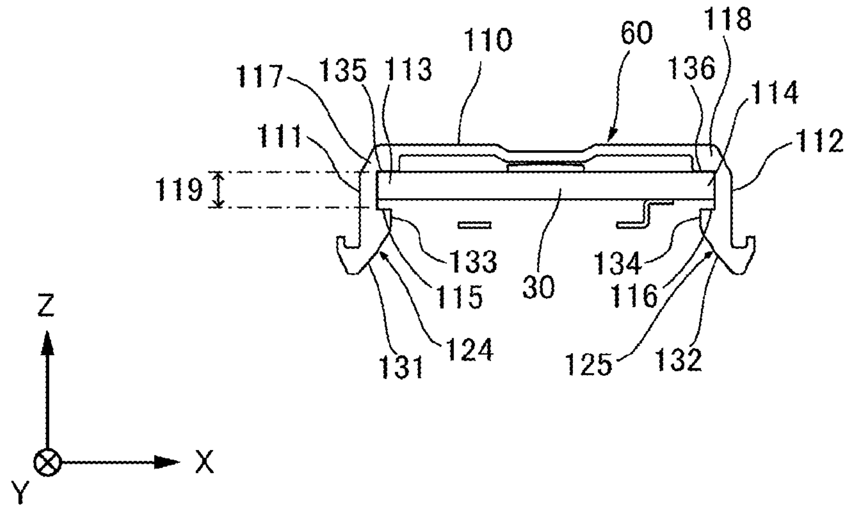
FIG. 16 is a cross-sectional view of a sheet portion according to the third embodiment taken along a line B-B.
Figure 17:
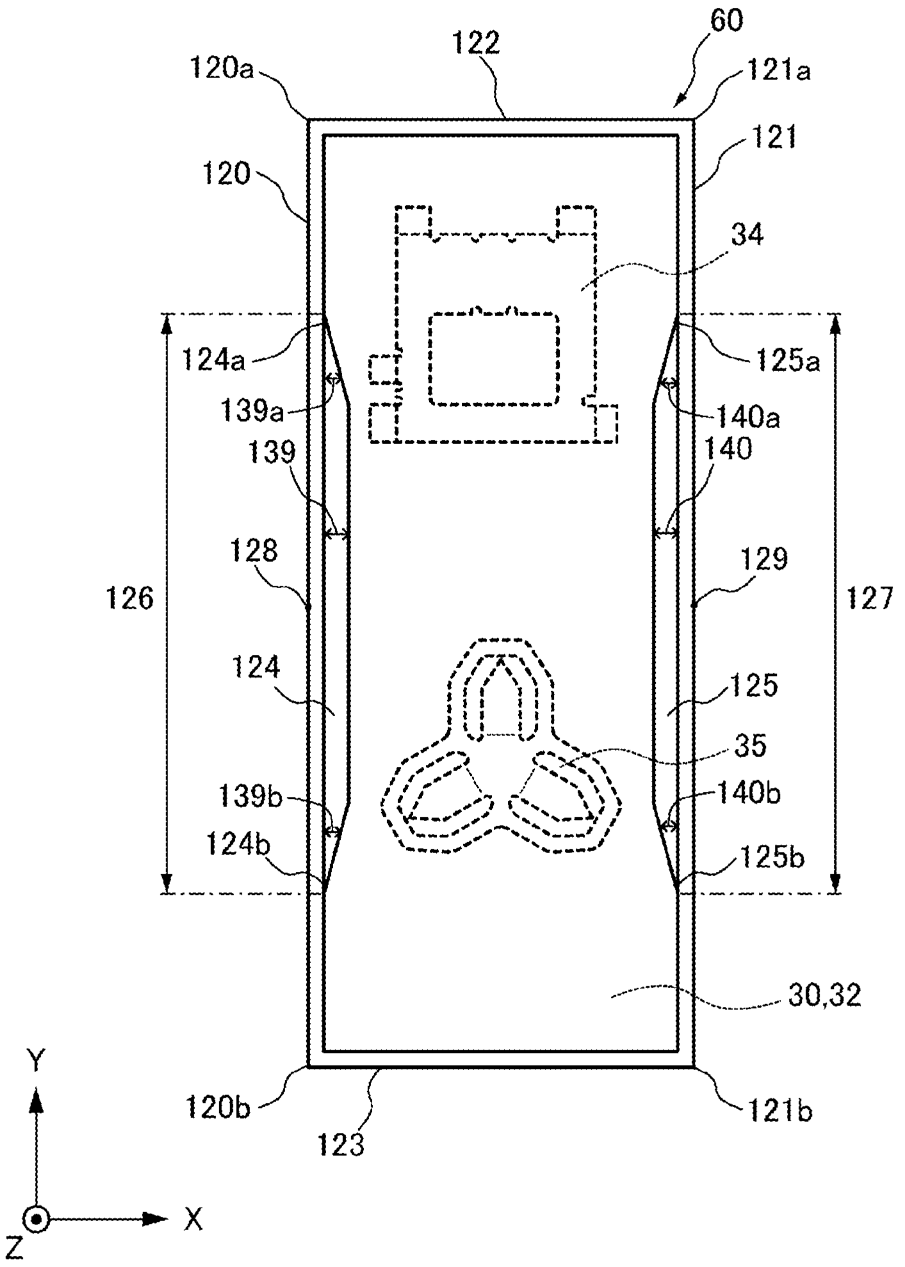
FIG. 17 is a diagram showing a case where an electronic board is attached to the sheet portion according to the third embodiment.
Figure 18:
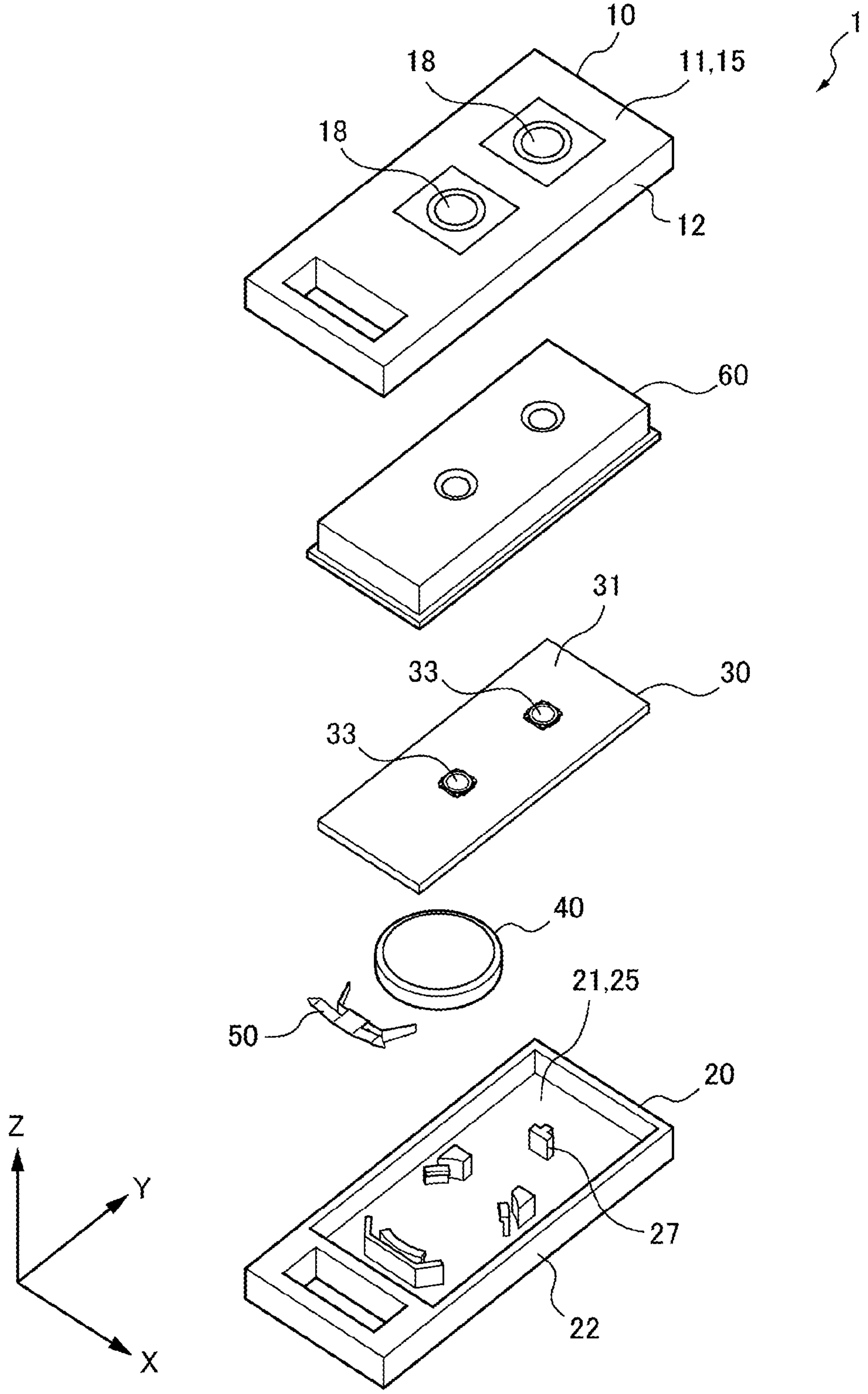
FIG. 18 is an exploded perspective view of the electronic key terminal for a vehicle according to the third embodiment as viewed from above.
Figure 19:
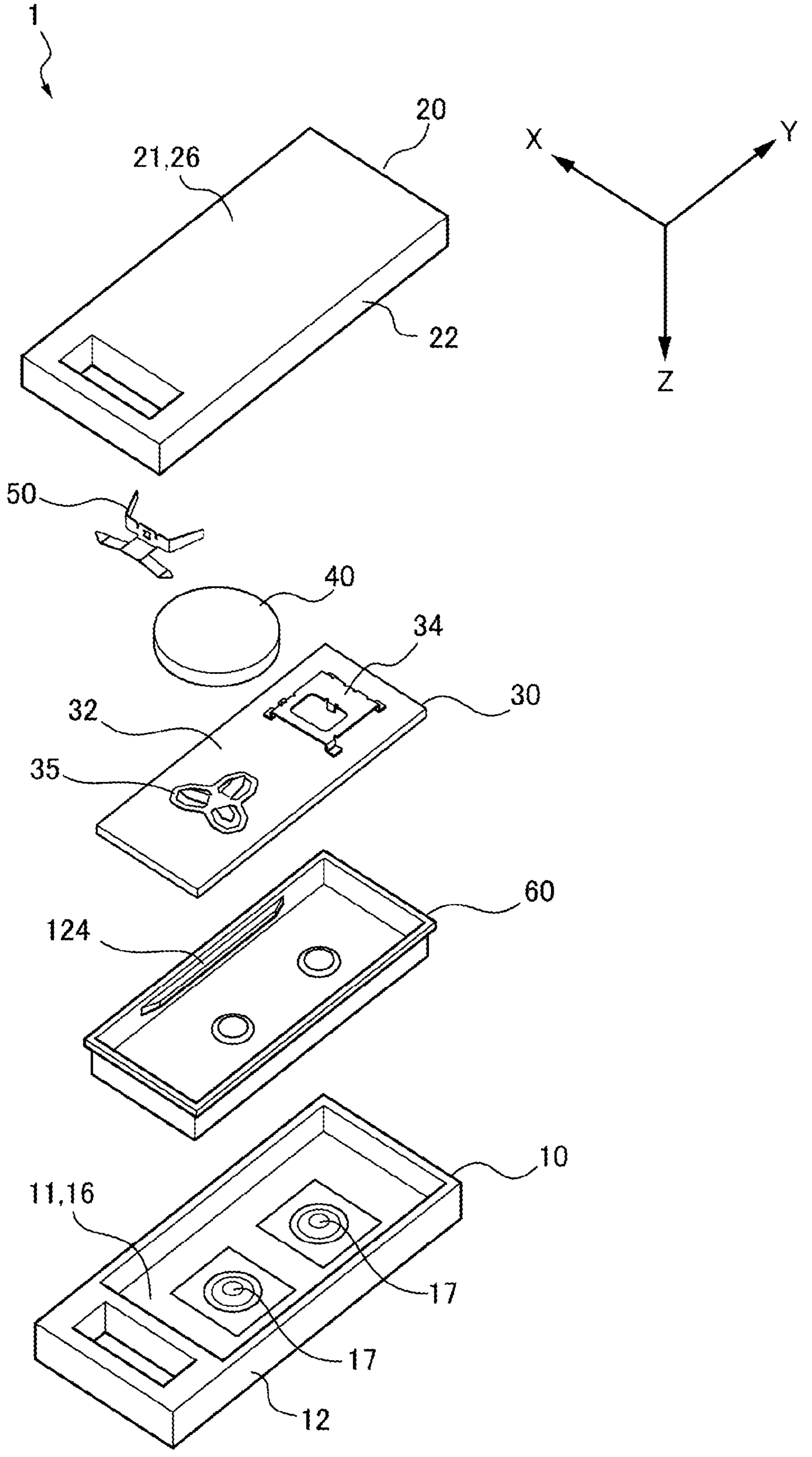
FIG. 19 is an exploded perspective view of the electronic key terminal for a vehicle according to the third embodiment as viewed from below.

FIG. 10 is a perspective view of an electronic key terminal for a vehicle according to the third embodiment. FIG. 11 is a top view of the electronic key terminal for a vehicle according to the third embodiment. FIG. 12 is a cross-sectional view of the electronic key terminal for a vehicle taken along a line A-A of FIG. 11. FIG. 13 is a cross-sectional view of the electronic key terminal for a vehicle taken along a line B-B of FIG. 11. FIG. 14 is a cross-sectional view of the electronic key terminal for a vehicle taken along a line C-C of FIG. 11. FIG. 15 is a cross-sectional view of the electronic key terminal for a vehicle taken along a line D-D of FIG. 11. FIG. 16 is a cross-sectional view of a sheet portion according to the third embodiment taken along a line B-B. FIG. 17 is a diagram showing a case where an electronic board is attached to the sheet portion according to the third embodiment. FIG. 18 is an exploded perspective view of the electronic key terminal for a vehicle according to the third embodiment as viewed from above. FIG. 19 is an exploded perspective view of the electronic key terminal for a vehicle according to the third embodiment as viewed from below.

The electronic key terminal 1 for a vehicle transmits an electromagnetic wave including a predetermined wireless signal, and changes a behavior of the vehicle by propagating the electromagnetic wave to the vehicle. The vehicle may be a motorcycle. However, the motorcycle is an example, and the vehicle may be a one-wheeled vehicle, a three-wheeled vehicle, a four-wheeled vehicle, or an automobile having five or more wheels. The electronic key terminal 1 may be replaced with another term such as a smart key or a key fob.

For example, when the vehicle receives a predetermined wireless signal from the electronic key terminal 1 located within a predetermined range from a position of the vehicle, the vehicle permits unlocking of a steering wheel of the vehicle and starting of an engine. Accordingly, a driver of the vehicle can unlock the steering wheel of the vehicle and start the engine only by holding the electronic key terminal 1 and approaching the vehicle without inserting a physical key into the vehicle. When the vehicle does not receive a predetermined wireless signal from the electronic key terminal 1, the vehicle may automatically lock the steering wheel and prohibit the engine from being started.

As shown in FIG. 10, the electronic key terminal 1 has a flat, substantially rectangular parallelepiped shape. However, a shape of the electronic key terminal 1 is not limited to a substantially rectangular parallelepiped, and may be, for example, a substantially cube, a substantially ellipsoid, or the like.

For convenience of description, as shown in the drawings, an axis extending in a lateral direction of the electronic key terminal 1 is defined as an X axis, an axis perpendicular to the X axis and extending in a longitudinal direction of the electronic key terminal 1 is defined as a Y axis, and an axis perpendicular to the X axis and the Y axis is defined as a Z axis. For convenience of description, a positive direction of the Z axis may be referred to as "up", a negative direction of the Z axis may be referred to as "down", a positive direction of the X axis may be referred to as "right", a negative direction of the X axis may be referred to as "left", a negative direction of the Y axis may be referred to as "rear", and a positive direction of the Y axis may be referred to as "front". The expressions related to these directions are used for convenience of description and are not intended to limit the posture of the structure in actual use.

The electronic key terminal 1 includes the first case 10, the second case 20, the electronic board 30, the battery 40, the first battery contact 50, and the sheet portion 60.

The first case 10 constitutes an upper portion of a case of the electronic key terminal 1. The first case 10 includes the first planar portion 11 that constitutes a main surface and is disposed along a predetermined plane, and the first wall portion 12 that constitutes a side surface.

The second case 20 constitutes a lower portion of the case of the electronic key terminal 1. The second case 20 includes the second planar portion 21 that constitutes a main surface and is disposed along the predetermined plane, and the second wall portion 22 that constitutes a side surface. At least a part of the second case 20 is in contact with the first case 10.

The first case 10 and the second case 20 are disposed such that the first planar portion 11 and the second planar portion 21 face each other.

The first wall portion 12 of the first case 10 extends from a periphery of the first planar portion 11 toward the second case 20 (that is, downward). A first end portion 13 near a lower end of the first wall portion 12 is provided with a first locking portion 14.

The second wall portion 22 of the second case 20 extends from a periphery of the second planar portion 21 toward the first case 10 (that is, upward). A second end portion 23 near an upper end of the second wall portion 22 is provided with a second locking portion 24 locked to the first locking portion 14.

By locking the first locking portion 14 of the first wall portion 12 and the second locking portion 24 of the second wall portion 22, the first case 10 and the second case 20 are engaged and attached. That is, at least a part of the first wall portion 12 of the first case 10 is in contact with the second case 20. Accordingly, for example, the second case 20 can be separated from the first case 10 to replace the battery 40, and the second case 20 can be engaged with and attached to the first case 10 again.

The sheet portion 60 includes a third planar portion 110 (see FIGS. 15 and 16). At least a part of the sheet portion 60 is disposed along the predetermined plane between the first planar portion 11 and the second planar portion 21. Third wall portions 111, 112, 137, and 138 (see FIGS. 15 and 16) that protrude in a direction from the first planar portion 11 toward the second planar portion 21 are provided in at least a part of a periphery of the third planar portion 110. In a plan view as viewed in a direction from the second planar portion 21 toward the first planar portion 11, an inner space defined by the third wall portions 111, 112, 137, and 138 may accommodate an entire part of the electronic board 30 (see FIG. 17). The sheet portion 60 has a predetermined elastic modulus. Therefore, the sheet portion 60 may be read as an elastic member. Details of a shape of the sheet portion 60 will be described later.

The electronic board 30 has a substantially rectangular flat plate shape and is housed in a space defined by the first case 10 and the second case 20, and at least a part of the electronic board 30 is disposed along the predetermined plane (for example, an XY plane) between the third planar portion 110 of the sheet portion 60 and the second surface portion 21 of the second case 20. The electronic board 30 has a front surface 31 (first surface) that is a surface on a side of the first planar portion 11, and a back surface 32 (second surface) that is a surface on a side of the second planar portion 21. That is, the first planar portion 11, the second planar portion 21, the electronic board 30, and at least a part of the sheet portion 60 may be disposed substantially parallel to each other.

A switch 33 and an electronic circuit (not shown) are provided on the front surface 31 of the electronic board 30. The switch 33 is connected to the electronic circuit.

An antenna 34 and a second battery contact 35 are provided on the back surface 32 of the electronic circuit. The antenna 34 and the second battery contact 35 are connected to the electronic circuit.

The first battery contact 50 is disposed along the back surface 32 of the electronic board 30. The first battery contact 50 is connected to the electronic circuit.

The battery 40 is, for example, a button battery, and is disposed along the back surface 32 of the electronic board 30 so as to be in contact with the first battery contact 50 and the second battery contact 35. Incidentally, the battery 40 may be disposed along the front surface 31 of the electronic board 30. The battery 40 supplies electric power to the electronic circuit.

The electronic circuit operates by the electric power supplied from the battery 40, and transmits an electromagnetic wave from the antenna 34. The antenna 34 may receive an electromagnetic wave transmitted from the vehicle. Bluetooth (registered trademark) Low Energy (LE) may be used as a wireless signal transmitted and received between the electronic key terminal 1 and the vehicle. Hereinafter, Bluetooth LE is referred to as "BLE". Incidentally, the BLE is an example, and a low frequency (LF) signal or a radio frequency (RF) signal may be used as a wireless signal transmitted and received between the electronic key terminal 1 and the vehicle.

When the electronic circuit detects that the switch 33 is depressed, the electronic circuit implements a predetermined function assigned to the switch 33. For example, in a case where a function of switching power of the electronic key terminal 1 between ON and OFF is assigned to the switch 33, when the electronic circuit detects that the switch 33 is depressed, the electronic circuit switches the power of the electronic key terminal 1 to OFF if the power of the electronic key terminal 1 is in an ON state, and switches the power of the electronic key terminal 1 to ON if the power of the electronic key terminal 1 is in an OFF state. By turning off the power of the electronic key terminal 1, wireless communication between the electronic key terminal 1 and the vehicle can be stopped. For example, in a case where an answerback function of the vehicle is assigned to the switch 33, when the electronic circuit detects that the switch 33 is depressed, the electronic circuit transmits a wireless signal (electromagnetic wave) instructing answerback to the vehicle from the antenna 34. The vehicle that receives the wireless signal instructing the answerback from the electronic key terminal 1 performs an answerback operation. Examples of the answerback operation include blinking a lamp or producing a sound. In a case where the vehicle is an automobile having a door, a function of switching between locking and unlocking of the door of the vehicle may be assigned to the switch 33. Details of the configuration of the electronic circuit will be described later (see FIG. 20).

The first planar portion 11 of the first case 10 has an upper surface 15 (first surface) that is a surface on a side opposite to the electronic board 30, and a lower surface 16 (second surface) that is a surface on a side of the electronic board 30.

The second planar portion 21 of the second case 20 has an upper surface 25 that is a surface on a side of the electronic board 30, and a lower surface 26 that is a surface on a side opposite to the electronic board 30.

A protrusion portion 17 protruding toward the switch 33 of the electronic board 30 is provided on the lower surface 16 of the first planar portion 11 of the first case 10. The protrusion portion 17 may be replaced with another term such as a pusher or a pusher pin.

The second case 20 includes a board support portion 27 protruding from the second planar portion 21 toward the first planar portion 11. The board support portion 27 may be disposed at least corresponding to a position of the switch 33. For example, the switch 33 and the board support portion 27 may be disposed in a line in a Z-axis direction.

The first planar portion 11 of the first case 10 and at least a part of the first wall portion 12 of the first case 10 may be made of a uniform material. For example, the first case 10 may be made of an elastic resin. At least a part of the first case 10 may be made of metal.

The second case 20 may be made of a resin harder than that of the first case 10. At least a part of the second case 20 may be made of metal.

For example, the first case 10 may be made of an elastomer. The second case 20 may be made of an alloy material of polycarbonate and polyethylene terephthalate. The sheet portion 60 may be made of silicon rubber. That is, an elastic modulus of the first planar portion 11 of the first case 10 may be smaller than an elastic modulus of the second case 20 and larger than an elastic modulus of the sheet portion 60. For example, the first case 10 may be bent about ten times more easily than the second case 20. The sheet portion 60 may be about three times softer than the first case 10.

In the protrusion portion 17 of the first planar portion 11 of the first case 10, a thickness between the upper surface 15 and the lower surface 16 of the first planar portion 11 may continuously change along the predetermined plane (for example, the XY plane). For example, the protrusion portion 17 may be formed so as to have a smooth curve from a top portion having the largest thickness toward a foot portion having the smallest thickness.

In the first case 10, a thickness of at least a part of the first planar portion 11 may be thinner than a thickness of the first wall portion 12. For example, a thickness of a part of the first planar portion 11 where the protrusion portion 17 is provided may be thinner than the thickness of the first wall portion 12. Hereinafter, the portion of the first planar portion 11 where the protrusion portion 17 is provided is referred to as a button portion 18. In this way, the button portion 18 and the protrusion portion 17 may be integrally formed as a part of the first planar portion 11 of the first case 10. Accordingly, the number of components can be reduced and the manufacturing cost of the electronic key terminal 1 can be reduced as compared with a case where the button portion or the protrusion portion is configured as a separate body.

<Details of Sheet Portion>

A shape of the third planar portion 110 of the sheet portion 60 includes a first side 120 and a second side 121 facing the first side 120 in a plan view as viewed in a direction from the second planar portion 21 toward the first planar portion 11. The shape of the third planar portion 110 includes a third side 122 connecting one end portion 120*a* of the first side 120 and one end portion 121*a* of the second side 121, and a fourth side 123 connecting the other end portion 120*b* of the first side 120 and the other end portion 121*b* of the second side 121.

In the sheet portion 60, at least a part of the third wall portion 111 of the first side 120 of the third planar portion 110 includes a first protruding portion 124 protruding from the first side 120 toward the second side 121. At least a part of the third wall portion 112 of the second side 121 of the third planar portion 110 includes a second protruding portion 125 protruding from the second side 121 toward the first side 120. A first portion 113 of the electronic board 30, which is a part of the electronic board 30, is disposed between the third planar portion 110 and the first protruding portion 124, and a second portion 114 of the electronic board 30, which is a part of the electronic board 30, is disposed between the third planar portion 110 and the second protruding portion 125. In other words, in the plan view as viewed in the direction from the second planar portion 21 toward the first planar portion 11, the third wall portions 111, 112, 137, and 138 overlap the electronic board 30 at the first protruding portion 124 and the second protruding portion 125. The first protruding portion 124 and the second protruding portion 125 may be separated in a circumferential direction of the third wall portions 111, 112, 137, and 138. In a direction from the first side 120 toward the second side 121, a distance between a distal end of the first protruding portion 124 and a distal end of the second protruding portion 125 may be shorter than a length of the electronic board 30.

In the sheet portion 60, at least a part of a third wall portion 137 of the third side 122 of the third planar portion 110 may include a third protruding portion (not shown) protruding from the third side 122 toward the fourth side 123. At least a part of a third wall portion 138 of the fourth side 123 of the third planar portion 110 may include a fourth protruding portion (not shown) protruding from the fourth side 123 toward the third side 122.

A third protruding length (not shown) of the third protruding portion (not shown) may be shorter than a first protruding length 139 of the first protruding portion 124 and shorter than a second protruding length 140 of the second protruding portion 125. The third protruding length (not shown) may be 0 (zero) as shown in FIG. 17.

A fourth protruding length (not shown) of the fourth protruding portion (not shown) may be shorter than the first protruding length 139 of the first protruding portion 124 and shorter than the second protruding length 140 of the second protruding portion 125. The fourth protruding length (not shown) may be 0 (zero) as shown in FIG. 17.

The shape of the third planar portion 110 may be a rectangle. In a case where the shape of the third planar portion 110 is a rectangle, the first side 120 is a first long side of the rectangle, and the second side 121 is a second long side of the rectangle. The shape of the third planar portion 110 is not limited to a rectangle, and may be a perfect circle, an ellipse, a square, a trapezoid, or the like.

In the sheet portion 60, the first protruding portion 124 and the second protruding portion 125 may be disposed to face each other.

In the sheet portion 60, the first protruding portion 124 may be disposed in a part of the first side 120, including a first midpoint 128 (see FIG. 17) of the first side 120. A position of the first midpoint 128 of the first side 120 is a position bisecting the first side 120, and a distance from the one end portion 120*a* of the first side 120 to the first midpoint 128 may be equal to a distance from the other end portion 120*b* of the first side 120 to the first midpoint 128. The first protruding portion 124 may be disposed over a first section 126 on the first side 120. A length of the first section 126 may be equal to or greater than ¼ and equal to or less than ¾ of a length of the first side 120. The length of the first section 126 is an example and is not limited.

In the sheet portion 60, the second protruding portion 125 may be disposed in a part of the second side 121, including a second midpoint 129 (see FIG. 17) of the second side 121. A position of the second midpoint 129 of the second side 121 is a position bisecting the second side 121, and a distance from the one end portion 121*a* of the second side 121 to the second midpoint 129 may be equal to a distance from the other end portion 121*b* of the second side 121 to the second midpoint 129. The second protruding portion 125 may be disposed over a second section 127 on the second side 121. A length of the second section 127 may be equal to or greater than ¼ and equal to or less than ¾ of a length of the second side 121. The length of the second section 127 is an example and is not limited.

In the sheet portion 60, the first protruding portion 124 includes one end portion 124*a* (positive direction of the Y axis) and the other end portion 124*b* (negative direction of the Y axis) in a direction along the first side 120. A first protruding length 139*a* of the one end portion 124*a* of the first protruding portion 124 gradually decreases along the first side 120 toward the one end portion 120*a* of the first side 120, and a first protruding length 139*b* of the other end portion 124*b* of the first protruding portion 124 gradually decreases along the first side 120 toward the other end portion 120*b* of the first side 120.

In the sheet portion 60, the second protruding portion 125 includes one end portion 125*a* (positive direction of the Y axis) and the other end portion 125*b* (negative direction of the Y axis) in a direction along the second side 121. A second protruding length 140*a* of the one end portion 125*a* of the second protruding portion 125 gradually decreases along the second side 121 toward the one end portion 121*a* of the second side 121, and a second protruding length 140*b* of the other end portion 125*b* of the second protruding portion 125 gradually decreases along the second side 121 toward the other end portion 121*b* of the second side 121.

In the sheet portion 60, the first protruding portion 124 has a first protruding surface 133 protruding from the first side 120 toward the second side 121. The first protruding portion 124 has a first protruding side surface 115 connecting the first protruding surface 133 and at least a part (a first part) of the third wall portion 111 of the first side 120, the first protruding side surface 115 being on a side of the third planar portion 110. The first protruding portion 124 has a second protruding side surface 131 that connects the first protruding surface 133 and at least a part (a second part) of the third wall portion 111 of the first side 120 and is disposed opposite to the third planar portion 110 with respect to the first protruding side surface 115. The second protruding side surface 131 of the first protruding portion 124 is obliquely disposed between the first protruding surface 133 of the first protruding portion 124 and at least a part (e.g., the second part) of the third wall portion 111 of the first side 120. For example, as shown in FIG. 16, the second protruding side surface 131 has a tapered shape expanding downward in a ZX cross section.

In the sheet portion 60, the second protruding portion 125 has a second protruding surface 134 protruding from the second side 121 toward the first side 120. The second protruding portion 125 has a third protruding side surface 116 connecting the second protruding surface 134 and at least a part (a third part) of the third wall portion 112 of the second side 121, the third protruding side surface 116 being on a side of the third planar portion 110. The second protruding portion 125 has a fourth protruding side surface 132 that connects the second protruding surface 134 and at least a part (a fourth part) of the third wall portion 112 of the second side 121 and is disposed opposite to the third planar portion 110 with respect to the third protruding side surface 116. The fourth protruding side surface 132 of the second protruding portion 125 is obliquely disposed between the second protruding surface 134 of the second protruding portion 125 and at least a part (e.g., the fourth part) of the third wall portion 112 of the second side 121. For example, as shown in FIG. 16, the fourth protruding side surface 132 has a tapered shape expanding downward in the ZX cross section.

In the sheet portion 60, the third planar portion 110 includes a first support portion 117 having a first abutment surface 135 capable of abutting against the electronic board 30 at a root of at least a part of the third wall portion 111 of the first side 120.

In the sheet portion 60, the third planar portion 110 includes a second support portion 118 having a second abutment surface 136 capable of abutting against the electronic board 30 at a root of at least a part of the third wall portion 112 of the second side 121.

In the sheet portion 60, a distance (a third section 119) between the first protruding side surface 115 of the first protruding portion 124 and the first abutment surface 135 of the first support portion 117 is longer than a thickness of the electronic board 30.

In the sheet portion 60, a distance (the third section 119) between the third protruding side surface 116 of the second protruding portion 125 and the second abutment surface 136 of the second support portion 118 is longer than the thickness of the electronic board 30.

The electronic board 30 is supported by at least the first abutment surface 135 of the first support portion 117 of the sheet portion 60, the second abutment surface 136 of the second support portion 118 of the sheet portion 60, and the board support portion 27 of the second case 20.

As shown in FIG. 15, the first case 10 includes a fourth locking portion 141 in at least a part of a vicinity of the lower end of the first wall portion 12 on a positive direction side of the Y axis, and a fourth locking portion 142 in at least a part of a vicinity of the lower end of the first wall portion 12 on a negative direction side of the Y axis. The second case 20 includes a fifth locking portion 143 in at least a part of a vicinity of the upper end of the second wall portion 22 on the positive direction side of the Y axis. The sheet portion 60 includes a third locking portion 28 in at least a part of a vicinity of a lower end of the third wall portion 137 on the positive direction side of the Y axis, and includes a third locking portion 29 in at least a part of a vicinity of a lower end of the third wall portion 138 on the negative direction side of the Y axis.

By locking the fourth locking portion 141 and the fourth locking portion 142 of the first wall portion 12 in the first case 10 and the third locking portion 28 of the third wall portion 137 and the third locking portion 29 of the third wall portion 138 in the sheet portion 60, respectively, the sheet portion 60 and the first case 10 are attached. By locking the first locking portion 14 and the fourth locking portion 141 of the first wall portion 12 in the first case 10 and the second locking portion 24 and the fifth locking portion 143 of the second wall portion 22 in the second case 20, respectively, the first case 10 and the second case 20 are engaged and attached. At this time, at least a part of the third wall portion 111 of the first side 120, at least a part of the third wall portion 112 of the second side 121, at least a part of the third wall portion 137 of the third side 122, and at least a part of the third wall portion 138 of the fourth side 123 in the sheet portion 60 are in close contact with the upper surface 25 of the second planar portion 21 of the second case 20. Accordingly, the electronic board 30 is sealed by the sheet portion 60, and thus a waterproof function for the electronic board 30 is implemented.

The elastic modulus of the sheet portion 60 may be smaller than an elastic modulus of the first case 10 and smaller than the elastic modulus of the second case 20.

<Method for Attaching Electronic Board to Sheet Portion>

A method for attaching the electronic board 30 to the sheet portion 60 will be described with reference to FIG. 16. FIG. 16 shows a state after the electronic board 30 is attached to the sheet portion 60. An operator attaches the electronic board 30 to the sheet portion 60 by, for example, the following procedures 1 to 4.

(Procedure 1) The operator places the sheet portion 60 on a workbench with the third planar portion 110 facing downward (that is, with an opening portion of the sheet portion 60 facing upward). That is, the operator places the sheet portion 60 shown in FIG. 16 upside down.

(Procedure 2) The operator temporarily places the electronic board 30 in the opening portion of the sheet portion 60. That is, the operator temporarily places the electronic board 30 such that side surfaces in a longitudinal direction of the electronic board 30 are in contact with the second protruding side surfaces 131 and 132 of the sheet portion 60.

(Procedure 3) The operator presses the electronic board 30 downward (that is, in a direction approaching the third planar portion 110). Accordingly, the electronic board 30 approaches the third planar portion 110 while expanding an inclined surface of the second protruding side surface 131 of the first protruding portion 124 in the negative direction of the X axis and an inclined surface of the fourth protruding side surface 132 of the second protruding portion 125 in the positive direction of the X axis (that is, while elastically deforming the first protruding portion 124 and the second protruding portion 125 (third wall portions 111 and 112)). At this time, since the second protruding side surfaces 131 and 132 are inclined surfaces, the operator can smoothly press the electronic board 30 in the direction approaching the third planar portion 110.

(Procedure 4) The operator further presses the electronic board 30 downward. Accordingly, the electronic board 30 passes through the first protruding surface 133 and the second protruding surface 134 and moves below the first protruding side surfaces 115 and 116 (that is, in a direction close to the third planar portion 110). When the electronic board 30 moves below the first protruding side surfaces 115 and 116, the first protruding portion 124 and the second protruding portion 125 (third wall portions 111 and 112) return to original positions thereof by elastic force. At this time, since the distance between the first protruding side surface 115 of the first protruding portion 124 and the first abutment surface 135 of the first support portion 117 and the distance between the third protruding side surface 116 of the second protruding portion 125 and the second abutment surface 136 of the second support portion 118 are longer than the thickness of the electronic board 30, the electronic board 30 is fitted into a recess (corresponding to the third section 119) formed by the first protruding side surface 115 of the first protruding portion 124 and the first abutment surface 135 and a recess (corresponding to the third section 119) formed by the third protruding side surface 116 of the second protruding portion 125 and the second abutment surface 136, as shown in FIG. 16. That is, the electronic board 30 is attached to the sheet portion 60. In addition, the electronic board 30 is supported by the first support portion 117 (first abutment surface 135) and the second support portion 118 (second abutment surface 136).

In this way, the operator can easily attach the electronic board 30 to the sheet portion 60 only by temporarily placing the electronic board 30 in the opening portion of the sheet portion 60 and pressing the electronic board 30 toward the third planar portion 110 of the sheet portion 60. Therefore, as shown in FIGS. 18 and 19, the operator can easily assemble the electronic key terminal 1 by placing the sheet portion 60 to which the electronic board 30 is attached inside the second case 20 and engaging the first case 10 with the second case 20.

<Block Configuration of Wireless System>

Figure 20:
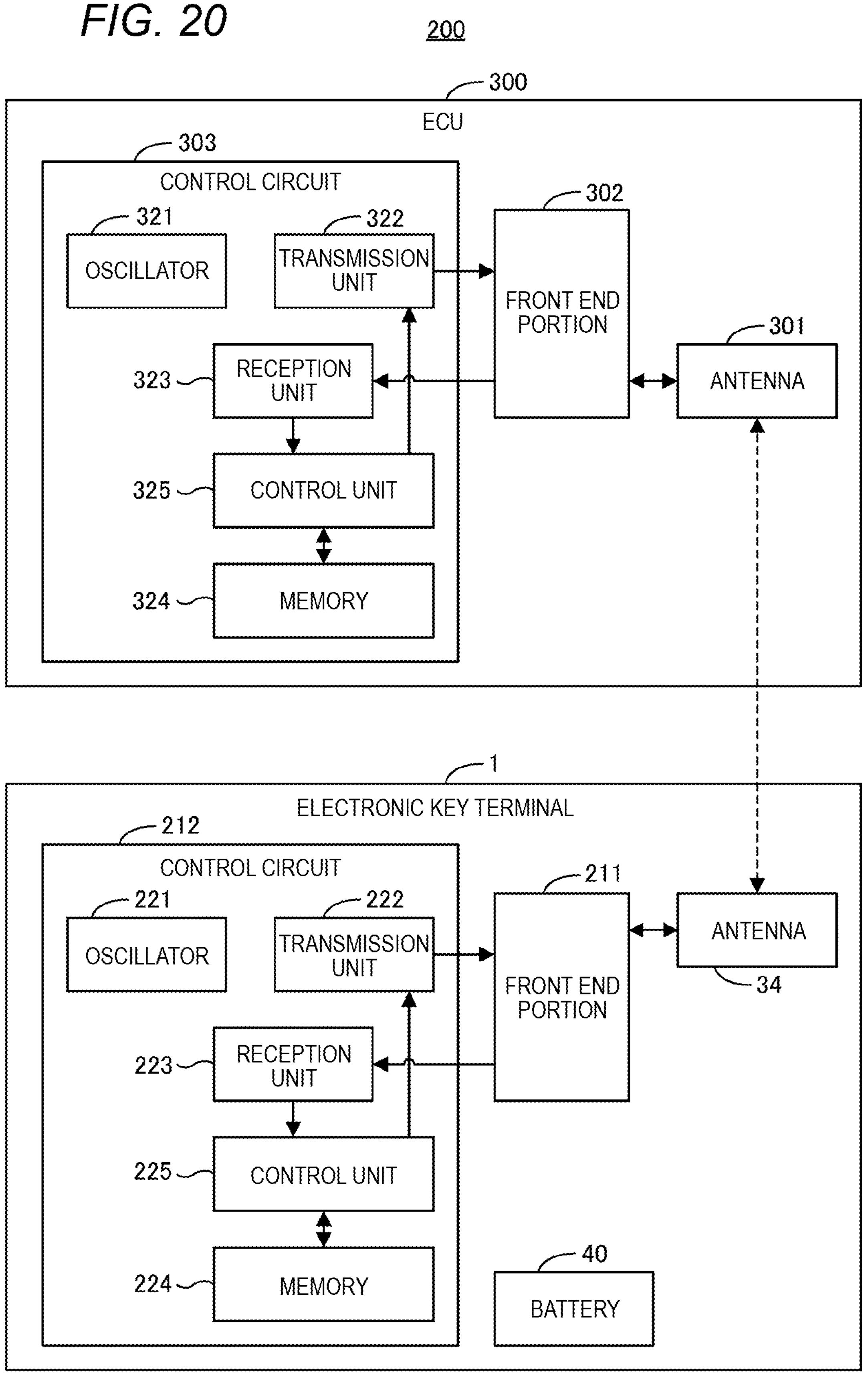
FIG. 20 is a block diagram showing a schematic configuration of a wireless system according to the third embodiment.

FIG. 20 is a block diagram showing a schematic configuration of a wireless system according to the third embodiment.

As shown in FIG. 20, the wireless system 200 includes the electronic key terminal 1 described above and the electronic control unit (ECU) 300 mounted on the vehicle.

The electronic key terminal 1 described above is registered in the ECU 300 in advance so as to be paired with the ECU 300 mounted on the vehicle. For example, Bluetooth LE (BLE) is used for communication between the electronic key terminal 1 and the ECU 300. A frequency used in BLE is a 2.4 GHz band, and a communication distance is about 100 m.

<<Electronic Key Terminal>>

In FIG. 20, the electronic key terminal 1 includes the antenna 34, the front end portion 211, and the control circuit 212 as the electronic circuit on the electronic board 30. In addition, the electronic key terminal 1 includes the battery 40 that supplies electric power to the electronic circuit.

The antenna 34 is, for example, one dipole antenna. The antenna 34 is not limited to a dipole antenna, and may include a plurality of antenna elements.

The front end portion 211 performs amplification of a weak signal, conversion from a high frequency to a low frequency, prevention of wraparound of a transmission signal to a reception unit side, or the like.

The control circuit 212 includes the oscillator 221, the transmission unit 222, the reception unit 223, the memory 224, and the control unit 225.

The oscillator 221 is a local oscillator that generates a carrier signal. The transmission unit 222 generates a radio wave from IQ data (baseband signal) to be transmitted, and transmits the generated radio wave from the antenna 34 via the front end portion 211. The reception unit 223 acquires the radio wave received by the antenna 34 via the front end portion 211, extracts the IQ data from the acquired radio wave, and detects a received signal strength indication (RSSI).

The control unit 225 performs control to transmit the radio wave through the transmission unit 222. The control unit 225 performs control to detect the RSSI of the radio wave received through the reception unit 223 and store the detected RSSI in the memory 224. The control unit 225 may acquire a distance between the vehicle and the electronic key terminal 1 based on the detected RSSI of the radio wave. The control unit 225 may notify the ECU 300 of the vehicle of the detected RSSI of the radio wave. Accordingly, the ECU 300 of the vehicle can acquire the distance between the vehicle and the electronic key terminal 1 by using the RSSI of the radio wave notified from the electronic key terminal 1.

The control unit 225 includes a processor (not shown), a read only memory (ROM) storing a program for controlling the processor, and a random access memory (RAM) used for an operation of the processor. The processor may be read as a central processing unit (CPU), an integrated circuit, a large scale integrated circuit (LSI), a controller, an application specific integrated circuit (ASIC), a field programmable gate array (FPGA), or the like. The memory 224 may be either a volatile memory or a nonvolatile memory (for example, a flash memory).

<<ECU>>

In FIG. 20, the ECU 300 mounted on the vehicle includes the antenna 301, the front end portion 302, and the control circuit 303.

The antenna 301 is, for example, one dipole antenna. The antenna 301 is not limited to a dipole antenna, and may include a plurality of antenna elements.

Similar to the front end portion 211 of the electronic key terminal 1 described above, the front end portion 302 performs amplification of a weak signal, conversion from a high frequency to a low frequency, prevention of wrap-around of a transmission signal to a reception unit side, or the like.

The control circuit 303 includes the oscillator 321, the transmission unit 322, the reception unit 323, the memory 324, and the control unit 325.

The oscillator 321 is a local oscillator that generates a carrier signal, similar to the oscillator 221 of the control circuit 212 of the electronic key terminal 1 described above. The transmission unit 322 performs control to generate a radio wave from IQ data (baseband signal) to be transmitted and transmit the generated radio wave from the antenna 301 via the front end portion 302. The reception unit 323 acquires the radio wave received by the antenna 301 via the front end portion 302, extracts the IQ data from the acquired radio wave, and detects a received signal strength indication (RSSI).

The control unit 325 performs control to transmit the radio wave through the transmission unit 322. The control unit 325 performs control to detect the RSSI of the radio wave received through the reception unit 323 and store the detected RSSI in the memory 324. The control unit 325 may acquire a distance between the vehicle and the electronic key terminal 1 based on the RSSI of the received radio wave.

After calculating the distance between the vehicle and the electronic key terminal 1, the control unit 325 changes a behavior of the vehicle according to the calculated distance. For example, when the distance between the vehicle and the electronic key terminal 1 is equal to or greater than a predetermined value, the ECU 300 may not accept an operation of the electronic key terminal 1, and when the distance is equal to or less than the predetermined value, the ECU 300 may accept the operation of the electronic key terminal 1. When the distance between the vehicle and the electronic key terminal 1 is the predetermined value, the ECU 300 may or may not receive the operation of the electronic key terminal 1.

Similar to the control unit 225 of the electronic key terminal 1, the control unit 325 includes a processor (not shown), a ROM storing a program for controlling the processor, and a RAM used for an operation of the processor. The memory 324 may be either a volatile memory or a nonvolatile memory (for example, a flash memory).

Although the embodiment has been described with reference to the accompanying drawings, the present disclosure is not limited to such an example. It will be apparent to those skilled in the art that various changes, modifications, substitutions, additions, deletions, and equivalents can be conceived within the scope of the claims, and it should be understood that such changes and the like also belong to the technical scope of the present disclosure. Components in the above embodiment may be optionally combined within a range not departing from the spirit of the invention.

The technique of the present disclosure is useful for an electronic key terminal having a circuit board.

This application is based on and claims priority under 35 USC 119 from Japanese Patent Application No. 2021-128996 filed on Aug. 5, 2021 and Japanese Patent Application No. 2022-006534 filed on Jan. 19, 2022, the contents of which are incorporated herein by reference.

What is claimed is:

1. An electronic key terminal comprising:

a first case having a first planar portion disposed along a predetermined plane;

a second case having a second planar portion disposed along the predetermined plane, at least a part of the second case being in contact with the first case;

an elastic member having a predetermined elastic modulus, the elastic member comprising:

a third planar portion, at least a part of the third planar portion being disposed along the predetermined plane between the first planar portion and the second planar portion; and a wall portion protruding from at least a part of a periphery of the third planar portion in a direction from the first planar portion toward the second planar portion; and an electronic board housed in a space defined by the first case and the second case, at least a part of the electronic board being disposed along the predetermined plane between the third planar portion and the second planar portion, wherein in a plan view as viewed in a direction from the second planar portion toward the first planar portion, a shape of the third planar portion has a first side and a second side facing the first side, wherein at least a part of the wall portion of the first side of the third planar portion comprises a first protruding portion protruding from the first side toward the second side, wherein at least a part of the wall portion of the second side of the third planar portion comprises a second protruding portion protruding from the second side toward the first side, wherein a first portion of the electronic board, which is a part of the electronic board, is disposed between the third planar portion and the first protruding portion, and wherein a second portion of the electronic board, which is a part of the electronic board, is disposed between the third planar portion and the second protruding portion.

2. The electronic key terminal according to claim 1, wherein the shape of the third planar portion has a third side connecting one end portion of the first side and one end portion of the second side, and a fourth side connecting another end portion of the first side and another end portion of the second side, wherein at least a part of the wall portion of the third side of the third planar portion comprises a third protruding portion protruding from the third side toward the fourth side, wherein at least a part of the wall portion of the fourth side of the third planar portion comprises a fourth protruding portion protruding from the fourth side toward the third side, wherein a third protruding length of the third protruding portion is shorter than a first protruding length of the first protruding portion and shorter than a second protruding length of the second protruding portion, and wherein a fourth protruding length of the fourth protruding portion is shorter than the first protruding length of the first protruding portion and shorter than the second protruding length of the second protruding portion.

3. The electronic key terminal according to claim 1, wherein the shape of the third planar portion is a rectangle, wherein the first side is a first long side of the rectangle, and wherein the second side is a second long side of the rectangle.

4. The electronic key terminal according to claim 1, wherein the first protruding portion and the second protruding portion are disposed to face each other.

5. The electronic key terminal according to claim 1, wherein the first protruding portion is disposed at a part of the first side, the part of the first side comprising a midpoint of the first side, and wherein the second protruding portion is disposed at a part of the second side, the part of the second side comprising a midpoint of the second side.

6. The electronic key terminal according to claim 1, wherein the first protruding portion is disposed over a first section on the first side, wherein the second protruding portion is disposed over a second section on the second side, wherein a length of the first section is equal to or greater than ¼ of a length of the first side and equal to or less than ¾ of the length of the first side, and wherein a length of the second section is equal to or greater than ¼ of a length of the second side and equal to or less than ¾ of the length of the second side.

7. The electronic key terminal according to claim 1, wherein the first protruding portion comprises one end portion and another end portion in a direction along the first side, wherein a first protruding length of the one end portion of the first protruding portion gradually decreases along the first side, wherein a first protruding length of the another end portion of the first protruding portion gradually decreases along the first side, wherein the second protruding portion comprises one end portion and another end portion in a direction along the second side, wherein a second protruding length of the one end portion of the second protruding portion gradually decreases along the second side, and wherein a second protruding length of the another end portion of the second protruding portion gradually decreases along the second side.

8. The electronic key terminal according to claim 1, wherein the first protruding portion comprises:

a first protruding surface protruding from the first side toward the second side;

a first protruding side surface connecting the first protruding surface and a first part of the wall portion of the first side, the first part being at least a part of the wall portion of the first side, the first protruding side surface being disposed on a side of the third planar portion; and a second protruding side surface that connects the first protruding surface and a second part of the wall portion of the first side, the second part being at least a part of the wall portion of the first side, the second protruding side surface being disposed opposite to the third planar portion with respect to the first protruding side surface, and wherein the second protruding portion comprises:

a second protruding surface protruding from the second side toward the first side;

a third protruding side surface connecting the second protruding surface and a third part of the wall portion of the second side, the third part being at least a part of the wall portion of the second side, the third protruding side surface being on a side of the third planar portion; and a fourth protruding side surface that connects the second protruding surface and a fourth part of the wall portion of the second side, the fourth part being at least a part of the wall portion of the second side, the fourth protruding side surface being disposed opposite to the third planar portion with respect to the third protruding side surface.

9. The electronic key terminal according to claim 8, wherein the second protruding side surface of the first protruding portion is disposed obliquely between the first protruding surface of the first protruding portion and the second part of the wall portion of the first side, and wherein the fourth protruding side surface of the second protruding portion is obliquely disposed between the second protruding surface of the second protruding portion and the fourth part of the wall portion of the second side.

10. The electronic key terminal according to claim 8, wherein the third planar portion comprises a first support portion at a root of at least a part of the wall portion of the first side, the first support portion having a first abutment surface configured to abut against the electronic board, wherein the third planar portion comprises a second support portion at a root of at least a part of the wall portion of the second side, the second support portion having a second abutment surface configured to abut against the electronic board, wherein a distance between the first protruding side surface of the first protruding portion and the first abutment surface of the first support portion is longer than a thickness of the electronic board, and wherein a distance between the third protruding side surface of the second protruding portion and the second abutment surface of the second support portion is longer than the thickness of the electronic board.

11. The electronic key terminal according to claim 10, wherein the second case comprises a board support portion protruding from the second planar portion toward the first planar portion, and wherein the electronic board is supported by at least the first abutment surface of the first support portion, the second abutment surface of the second support portion, and the board support portion.

12. The electronic key terminal according to claim 1,
wherein the first case and the second case comprise locking portions, respectively, the locking portions being locked to each other, and
wherein in a state where the first case and the second case are locked to each other, at least a part of the wall portion of the first side and at least a part of the wall portion of the second side are in close contact with the second planar portion of the second case.

13. The electronic key terminal according to claim 1,
wherein an elastic modulus of the elastic member is smaller than an elastic modulus of the first case and also smaller than an elastic modulus of the second case.

14. The electronic key terminal according to claim 1,
wherein in the plan view as viewed in the direction from the second planar portion toward the first planar portion, a part of the wall portion does not overlap the electronic board.

15. The electronic key terminal according to claim 14,
wherein in the plan view as viewed in the direction from the second planar portion toward the first planar portion, the wall portion overlaps the electronic board at the first protruding portion and the second protruding portion.

16. The electronic key terminal according to claim 1,
wherein the first protruding portion and the second protruding portion are separated in a circumferential direction of the wall portion.

17. The electronic key terminal according to claim 1,
wherein in a direction from the first side toward the second side, a distance between a distal end of the first protruding portion and a distal end of the second protruding portion is shorter than a length of the electronic board.

18. The electronic key terminal according to claim 1,
wherein in the plan view as viewed in the direction from the second planar portion toward the first planar portion, an inner space defined by the wall portion accommodates an entire part of the electronic board.

19. The electronic key terminal according to claim 1,
wherein the electronic board comprises a switch, and
wherein the elastic member is disposed between the first planar portion of the first case and the switch of the electronic board.

* * * * *